(12) United States Patent
Ciesla et al.

(10) Patent No.: US 8,947,383 B2
(45) Date of Patent: Feb. 3, 2015

(54) USER INTERFACE SYSTEM AND METHOD

(75) Inventors: Craig Michael Ciesla, Mountain View, CA (US); Micah B. Yairi, Daly City, CA (US)

(73) Assignee: Tactus Technology, Inc., Fremont, CA (US)

( * ) Notice: Subject to any disclaimer, the term of this patent is extended or adjusted under 35 U.S.C. 154(b) by 439 days.

(21) Appl. No.: 13/456,010

(22) Filed: Apr. 25, 2012

(65) Prior Publication Data

US 2012/0242607 A1 Sep. 27, 2012

Related U.S. Application Data

(63) Continuation of application No. 12/497,622, filed on Jul. 3, 2009, now Pat. No. 8,179,375, which is a continuation-in-part of application No. 12/319,334, filed on Jan. 5, 2009, now Pat. No. 8,154,527, which is (Continued)

(51) Int. Cl.
*G06F 3/041* (2006.01)
*G09G 5/00* (2006.01)
*G06F 3/02* (2006.01)
(Continued)

(52) U.S. Cl.
CPC .......... *G06F 3/0202* (2013.01); *G06F 3/03547* (2013.01); *G06F 3/04886* (2013.01); *G06F 3/04895* (2013.01); *G06F 2203/04809* (2013.01)
USPC .......................................... 345/173; 345/156

(58) Field of Classification Search
CPC ....... G06F 3/016; G06F 3/041; G06F 3/0416; G06F 3/044; G06F 2203/04103; G06F 3/04886; G06F 2203/04809; G06F 3/04895; G06F 3/04883; G06F 3/0414; G09B 21/003–21/004; H01H 2215/046
USPC ..................... 345/156–184; 178/18.01–20.04
See application file for complete search history.

(56) References Cited

U.S. PATENT DOCUMENTS 3,034,628 A 5/1962 Wadey
3,659,354 A 5/1972 Sutherland
(Continued)

FOREIGN PATENT DOCUMENTS

CN 1260525 A 7/2000
JP 10255106 9/1998
(Continued)

OTHER PUBLICATIONS

Preumont, A. Vibration Control of Active Structures: An Introduction, Jul. 2011.
(Continued)

*Primary Examiner* — Patrick F Marinelli
(74) *Attorney, Agent, or Firm* — Jeffrey Schox; Peter Miller

(57) ABSTRACT

The user interface system of the preferred embodiments includes a sheet that defines a surface on one side and at least partially defines a cavity on an opposite side; a volume of a fluid contained within the cavity; a displacement device that modifies the volume of the fluid to expand the cavity, thereby outwardly deforming a particular region of the surface; and a sensor that detects a force applied by a user that inwardly deforms the particular region of the surface. The user interface system has been specifically designed to be used as the user interface for an electronic device, more preferably in an electronic device that benefits from an adaptive user interface, but may alternatively be used in any suitable application.

25 Claims, 13 Drawing Sheets

Related U.S. Application Data a continuation-in-part of application No. 11/969,848, filed on Jan. 4, 2008, now Pat. No. 8,547,339, said application No. 12/497,622 is a continuation-in-part of application No. 11/969,848, application No. 13/456,010, which is a continuation-in-part of application No. 13/414,589, filed on Mar. 7, 2012, which is a continuation of application No. 12/319,334, which is a continuation-in-part of application No. 11/969,848, application No. 13/456,010, which is a continuation-in-part of application No. 11/969,848.

(51) Int. Cl.
*G06F 3/0354* (2013.01)
*G06F 3/0488* (2013.01)
*G06F 3/0489* (2013.01)

(56) References Cited

U.S. PATENT DOCUMENTS

| | | |
|---|---|---|
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,920,343 A | 4/1990 | Schwartz |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael, Jr. et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |

(56) References Cited

U.S. PATENT DOCUMENTS

| | | |
|---|---|---|
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |

(56) References Cited

U.S. PATENT DOCUMENTS

| | | |
|---|---|---|
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 2001/0008396 A1 | 7/2001 | Komata |
| 2001/0043189 A1 | 11/2001 | Brisebois et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2003/0087698 A1 | 5/2003 | Nishiumi et al. |
| 2003/0179190 A1 | 9/2003 | Franzen |
| 2003/0206153 A1 | 11/2003 | Murphy |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0231489 A1 | 10/2005 | Ladouceur et al. |
| 2005/0253816 A1 | 11/2005 | Himberg et al. |
| 2005/0285846 A1 | 12/2005 | Funaki |
| 2006/0026521 A1 | 2/2006 | Hotelling et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248247 A1* | 10/2008 | Caine ............................ 428/152 |
| 2008/0248248 A1* | 10/2008 | Caine ............................ 428/155 |
| 2008/0248836 A1* | 10/2008 | Caine ............................ 455/566 |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0287167 A1* | 11/2008 | Caine ........................ 455/575.1 |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1* | 5/2009 | Caine et al. ..................... 341/34 |
| 2009/0128503 A1 | 5/2009 | Grant et al. |
| 2009/0129021 A1 | 5/2009 | Dunn |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0215500 A1 | 8/2009 | You et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0073241 A1 | 3/2010 | Ayala Vazquez et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0321335 A1* | 12/2010 | Lim et al. ....................... 345/174 |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0148793 A1 | 6/2011 | Ciesla et al. |

(56) References Cited

U.S. PATENT DOCUMENTS

| | | |
|---|---|---|
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1* | 7/2011 | Park et al. .................... 345/173 |
| 2011/0175838 A1 | 7/2011 | Higa |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| JP | 2006268068 A | 10/2006 |
| JP | 2006285785 A | 10/2006 |
| JP | 2009064357 A | 3/2009 |
| KR | 100677624 B | 1/2007 |
| WO | 2004028955 A | 4/2004 |
| WO | 2008037275 A | 4/2008 |
| WO | 2009002605 A | 12/2008 |
| WO | 2009044027 A2 | 4/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

Jeong et al., "Tunable Microdoublet Lens Array," Optical Society of America, Optics Express; vol. 12, No. 11. May 31, 2004, 7 Pages.

* cited by examiner

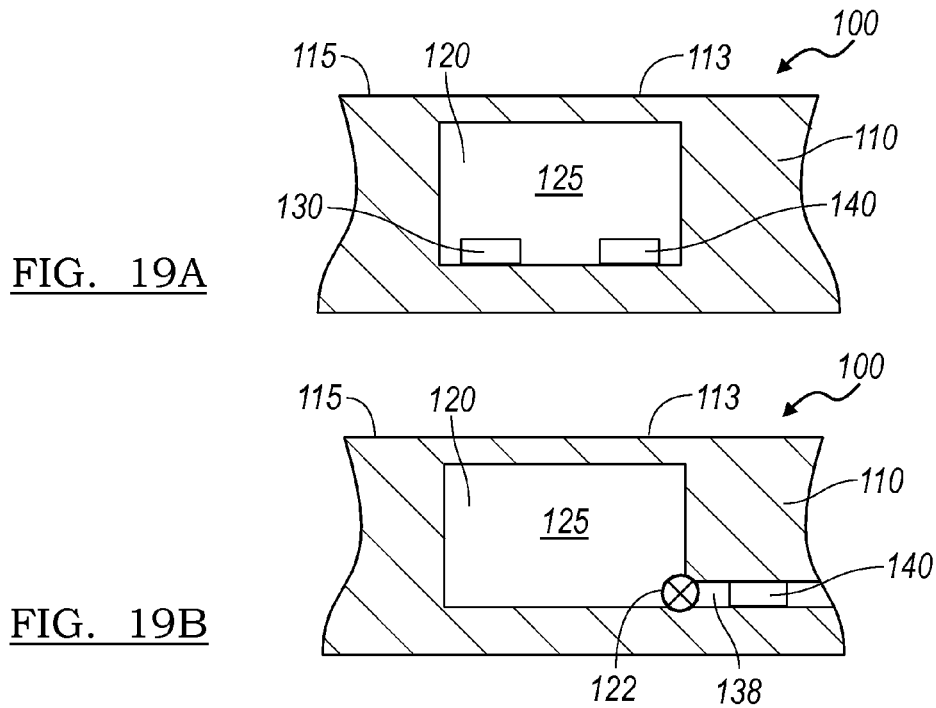
FIG. 19A
FIG. 19B
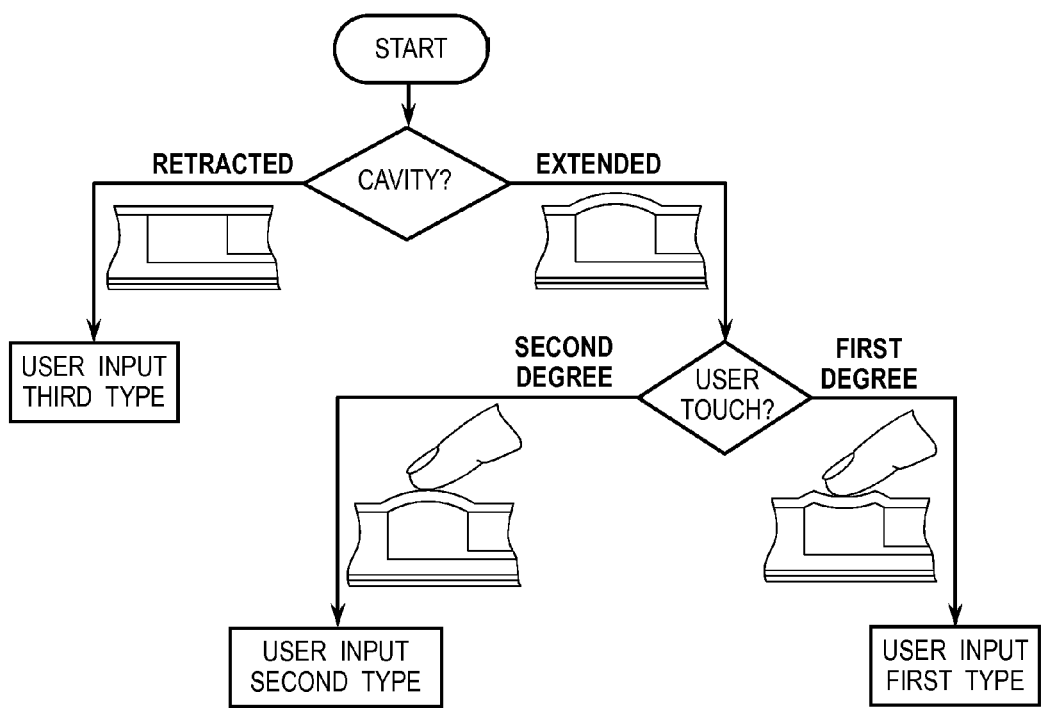
FIG. 20

USER INTERFACE SYSTEM AND METHOD

CROSS-REFERENCE TO RELATED APPLICATIONS

This application is a continuation of prior U.S. application Ser. No. 12/497,622, filed on 3 Jul. 2009, which is a continuation-in-part of prior U.S. application Ser. No. 12/319,334, filed on 5 Jan. 2009, which is a continuation-in-part of prior U.S. application Ser. No. 11/969,848, filed on 4 Jan. 2008, all of which are incorporated in their entirety by this reference. U.S. application Ser. No. 12/497,622 is also a continuation-in-part of prior U.S. application Ser. No. 11/969,848, filed on 4 Jan. 2008.

This application is also a continuation-in-part of prior U.S. application Ser. No. 13/414,589, filed on 7 Mar. 2012, which is a continuation of U.S. application Ser. No. 12/319,334, filed on 5 Jan. 2009, which is a continuation-in-part of prior U.S. application Ser. No. 11/969,848, filed on 4 Jan. 2008, all of which are incorporated in their entirety by this reference.

This application is also a continuation-in-part of prior U.S. application Ser. No. 11/969,848, filed on 4 Jan. 2008, which is incorporated in its entirety by this reference.

BACKGROUND

Static user input interfaces, such as those on a typical television remote control or on a mobile phone, provide users with one user interface that locks the interaction modes available between the device and the user. Devices with a static user input interface that may be used with a variety of applications also become very complicated because the static user input interface must be compatible with each application. In the case of universal remotes, user interaction may become very confusing for the user because of the abundance of buttons available that may either provide dual functionality between devices or are extraneous for any one particular device. In the case of mobile devices, such as a cellular phone with multiple functionalities that uses a static user input interface, adapting the available static user input interface to the plurality of functionalities of the device is also challenging. Additionally, as mobile devices become smaller and more powerful, functionality of the device may be severely hindered by a static user input interface.

Touch sensitive displays, e.g., touch screens, are able to provide a dynamic user input interface and are very useful in applications where the user interface is applied to a variety of uses, for example, in a universal remote where the user interface may change to adapt to the device that is being controlled by the user or in a cellular phone with multiple functionalities. However, unlike a static user input interface with a dedicated input device, such as a keypad with discrete well-defined keys, most touch sensitive displays are generally flat. As a result, touch sensitive displays do not provide any of the tactile guidance that may be seen in static user interfaces.

Hence, serious drawbacks exist in current commonly available user interfaces. In the case of a static user input interface, there is the benefit of tactile guidance but the serious drawback of inability to adapt to an application type. In the case of a touch sensitive display, there is the benefit of an adaptable display and dynamic user input interface but the serious drawback of no tactile guidance, resulting in incorrectly entered keystrokes and the need for the user to keep his or her eyes on the display. The importance of tactile guidance is readily apparent in the competition between the Apple iPhone and the Blackberry 8800. Additionally, with many touch sensitive displays, each touch made by the user is registered with the system, preventing the user from resting his or her finger on the surface of the display. In some touch sensitive displays, the reliance on the change in capacitance due to the presence of a finger at a location as the occurrence of a user input results in the inability for the touch sensitive display to detect user inputs when the user is wearing a glove or when other barriers between a finger and the screen are present.

This invention provides a new and useful user interface that combines many of the advantages of the benefits of a static user input interface and many of the advantages of a dynamic user input interface.

BRIEF DESCRIPTION OF THE FIGURES

FIGS. 19a and 19b are schematic views of a first and second variation of the sensor as a pressure sensor, respectively.

FIG. 20 is a flow chart of the different operation modes of the preferred embodiments.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
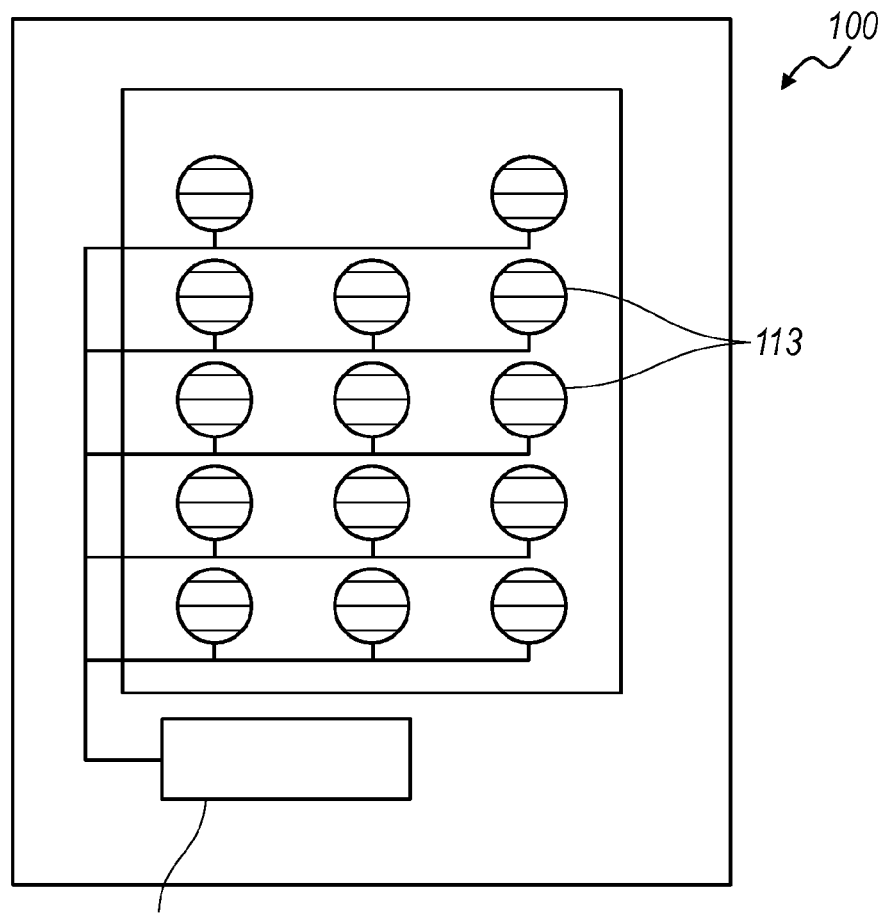
FIGS. 1a and 1b are a top view of the user interface system of a preferred embodiments and a cross-sectional view illustrating the operation of a button array in accordance to the preferred embodiments, respectively.
Figure 1B:
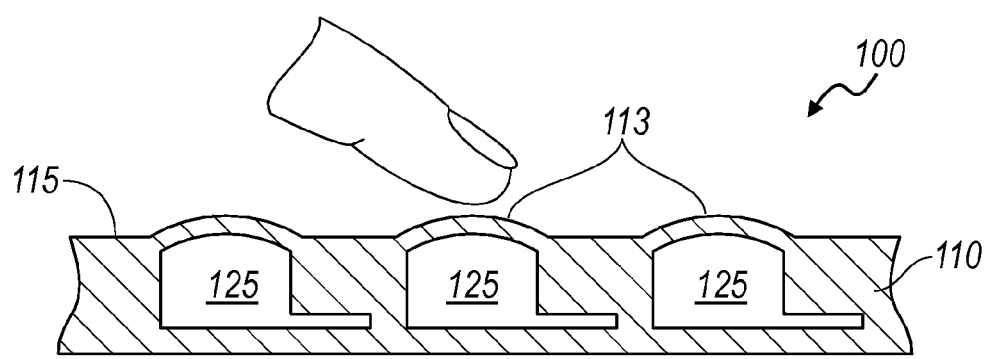
Figure 2A:
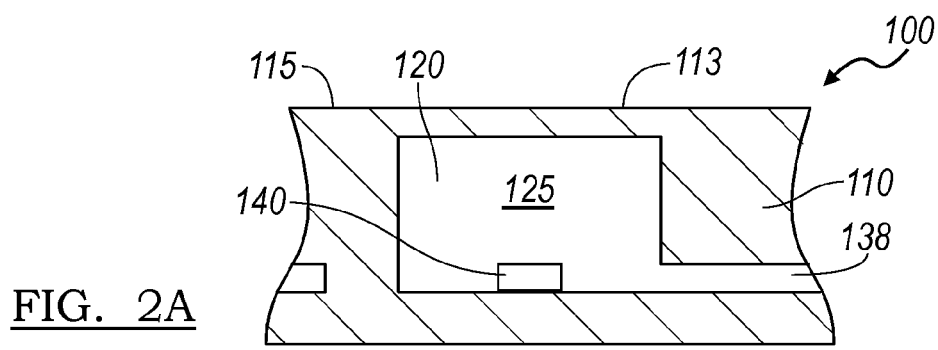
FIGS. 2a, 2b, and 2c are cross-sectional views of the retracted, extended, and user input modes of the preferred embodiments, respectively.
Figure 2B:
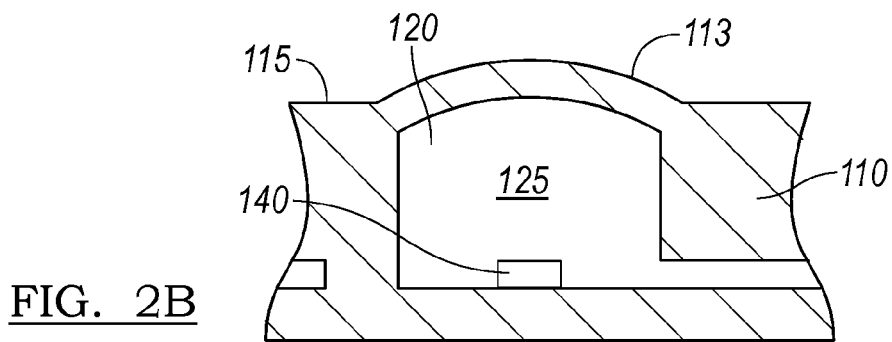
Figure 2C:
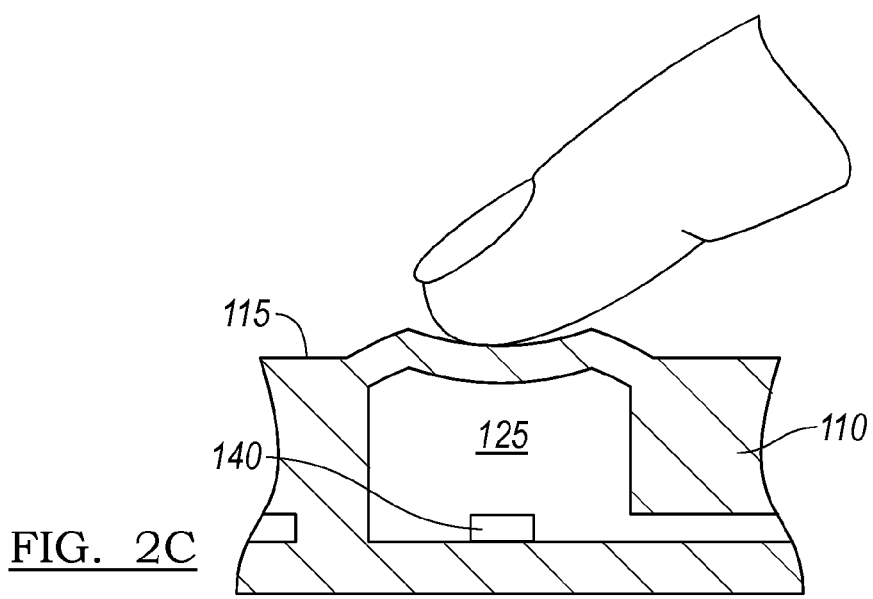
Figure 3:
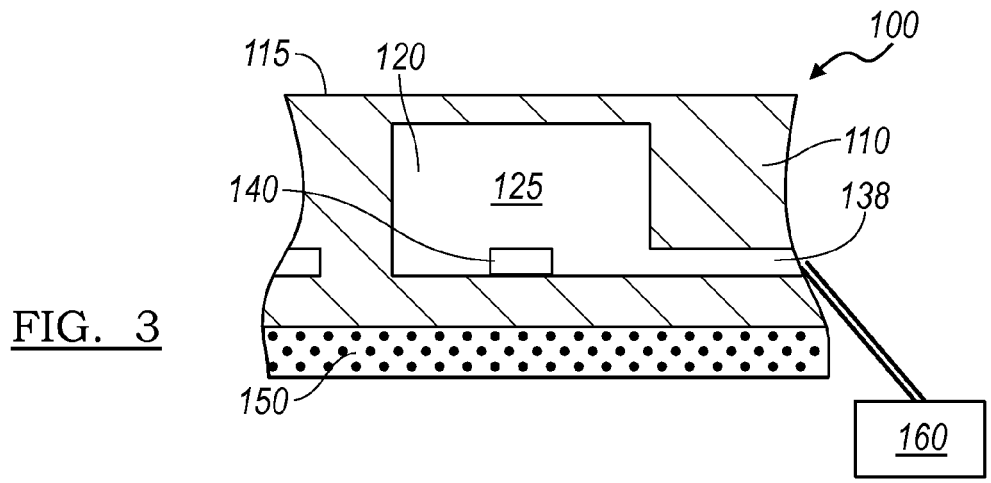
FIG. 3 is a cross-sectional view of the sheet, the cavity, the sensor, and the display of the preferred embodiments.

As shown in FIGS. 1 and 2, the user interface system 100 of the preferred embodiments includes a sheet 110 that defines a surface 115 and a cavity 125, a volume of a fluid 120 contained within the cavity 125, a displacement device 130 that modifies the volume of the fluid 120 to expand the cavity 125 (thereby outwardly deforming a particular region 113 of the surface 115), and a sensor 140 that detects a force applied by a user that inwardly deforms the particular region 113 of the surface 115. As shown in FIG. 3, the user interface system 100 may also include a display 150 coupled to the sheet no and adapted to output images to the user and a processor 160 that is preferably coupled to the sensor 140 to receive signals from the sensor 140 and coupled to the displacement device 130 to send signals to the displacement device 130. The sensor 140 may also be located in between the sheet no and the display 150. However, any other suitable arrangement of the components of the system 100 may be used.

The user interface system 100 of the preferred embodiments has been specifically designed to be used as the user interface for an electronic device, more preferably in an electronic device that benefits from an adaptive user interface. The electronic device, which may or may not include a display, may be an automotive console, a desktop computer, a laptop computer, a tablet computer, a television, a radio, a desk phone, a mobile phone, a PDA, a personal navigation device, a personal media player, a camera, a watch, a remote, a mouse, a trackpad, or a keyboard. The user interface system 100 may, however, be used as the user interface for any suitable device that interfaces with a user in a tactile and/or visual manner. As shown in FIG. 2, the surface 115 of the user interface system 100 preferably remains flat until a tactile guidance is to be provided at the location of the particular region 113. The surface 115 of the user interface system 100 may also be deformed when a user input is required. At that time, the displacement device 130 expands the cavity 125 to deform and/or expand the particular region 113 outward, preferably forming a button-like shape. With the button-like shape, the user will have tactile guidance when navigating for the expanded particular region 113 and will have tactile feedback when applying force onto the particular region 113 to provide input. The sensor 140 preferably senses the force that inwardly deforms the particular region 113. However, any other arrangement of the user interface system 100 suitable to providing tactile guidance and/or detecting user input may be used.

1. The Sheet

Figure 4:
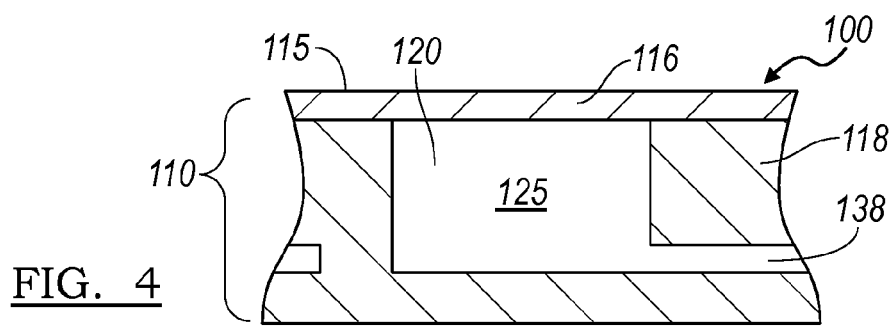
FIG. 4 is a cross-sectional view of the sheet split into a layer portion and a substrate portion.

As shown in FIGS. 1 and 2, the sheet 110 of the preferred embodiment functions to provide the surface 115 that interfaces with a user in a tactile manner and to at least partially define the cavity 125. The surface 115 is preferably continuous, such that when swiping a finger across the surface 115 a user would not feel any interruptions or seams. Alternatively, the surface 115 may include features that facilitate the user in distinguishing one region from another. The surface 115 is also preferably planar. The surface 115 is preferably arranged in a flat plane, but may alternatively be arranged in a curved or warped plane. The surface 115 also functions to deform upon an expansion of the cavity 125, and to preferably "relax" or "un-deform" back to a normal planar state upon retraction of the cavity 125. In one version, the sheet no contains a first portion that is elastic and a second portion that is relatively less elastic. In another version, sheet 110 is relatively more elastic in specific areas and relatively less elastic in other areas and is deformed by the expanded cavity 125 in the relatively more elastic areas. In another version, the sheet no is generally of the same elasticity. In yet another version, the sheet no includes or is made of a smart material, such as Nickel Titanium (commonly referred to as "Nitinol"), that has a selective and/or variable elasticity. The sheet no is preferably optically transparent, but may alternatively be translucent or opaque. In addition to the transparency, the sheet 110 preferably has the following properties: a high transmission, a low haze, a wide viewing angle, a minimal amount of back reflectance upon the display (if the display is included with the user interface system 100), scratch resistant, chemical resistant, stain resistant, relatively smooth (not tacky) to the touch, no out-gassing, and/or relatively low degradation rate when exposed to ultraviolet light. The sheet 110 is preferably made from a suitable elastic material, including polymers and silicon-based elastomers such as poly-dimethylsiloxane (PDMS) or RTV Silicon (e.g., RTV Silicon 615). In the version wherein the sheet no includes a first portion that is elastic and a second portion that is relatively inelastic, the inelastic portion is preferably made from a material including polymers or glass, for example, elastomers, silicon-based organic polymers such as poly-dimethylsiloxane (PDMS), thermoset plastics such as polymethyl methacrylate (PMMA), photo-curable solvent resistant elastomers such as perfluropoly-ethers, polyethylene terephthalate (PET), or any other suitable material. The sheet no may, however, be made of any suitable material that provides the surface 115 that deforms and defines a cavity 125. The sheet 110 may be manufactured using well-known techniques for micro-fluid arrays to create one or more cavities and/or micro channels. The sheet 110 may be constructed using multiple layers from the same material or from different suitable materials, for example, the sheet 110 may include a layer portion 116 of one material that defines the surface 115 and a substrate portion 118 of a second material (as shown in FIG. 4). The substrate portion 118 functions to support the layer portion 118 and to at least partially define the cavity 125. However, any other suitable arrangement, material, and manufacturing method may be used to create sheet 110.

Figure 24A:
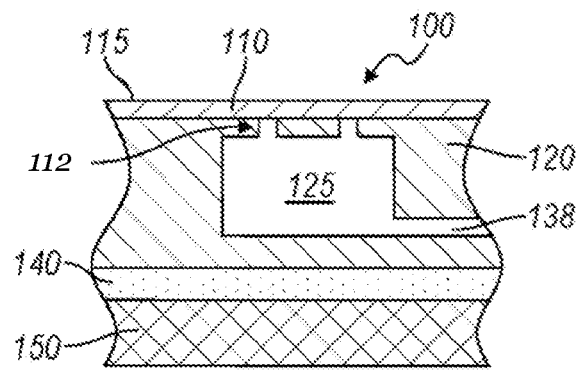
FIGS. 24a and 24b are cross-sectional views of a support member between the layer and the substrate, with the cavity in a retracted volume setting and an expanded volume setting, respectively.
Figure 24C:
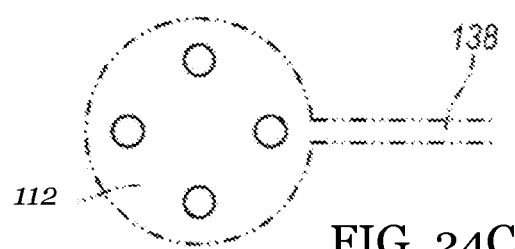
FIG. 24c is a top view of the support member.
Figure 24B:
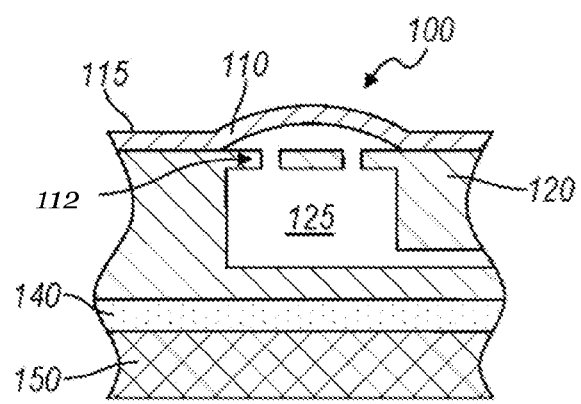
Figure 24D:
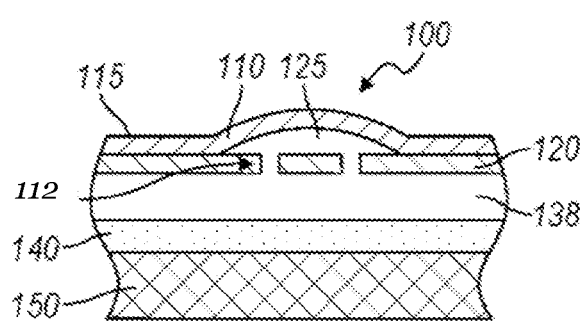
FIG. 24d is a cross-sectional view of an alternative support member that partially defines the cavity.

As shown in FIGS. 24a and 24b, the substrate 120 may include a lattice-like support member 112 under the particular region of the surface 115. When the cavity 125 is expanded and the deformation is present in the surface 115, the support member 112 functions to prevent a user from "pressing too far" into the deformation below the plane of the surface 115. When the cavity 125 is not expanded and the deformation is not present in the surface 115, the support member 112 functions to reduce (or potentially eliminate) the user from feeling "divots" in the surface 115 when swiping a finger across the surface 115. As shown in FIG. 24c, the support member 112 preferably includes holes or channels that allow for the expansion of the cavity 125 and the deformation of the surface 115. The support member 112 is preferably integrally formed with the substrate 124, but may alternatively be formed with the layer 110 or may be separately formed and later attached to the substrate 120. Finally, as shown in FIG. 24d, the support member 112 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least partially defines the cavity 125. In the preferred version, the substrate 120 is a single homogenous layer approximately 1 mm to 0.1 mm thick and can be manufactured using well-known techniques for micro-fluid arrays to create one or more cavities and/or micro channels. In alternative versions, the substrate 120 may be constructed using multiple layers from the same material or from different suitable materials.

As shown in FIG. 2, the cavity 125 of the preferred embodiment functions to hold a volume of fluid 120 and to have at least two volumetric settings: a retracted volume setting (shown in FIG. 2a) and an extended volume setting (shown in FIG. 2b). The fluid 120 is preferably a substantially incompressible fluid, but may alternatively be a compressible fluid. The fluid 120 is preferably a liquid (such as water, glycerin, or ethylene glycol), but may alternatively be a gas (such as air, nitrogen, or argon) or any other substance (such as a gel or aerogel) that expands the cavity 125 and deforms the surface 115. In the extended volume setting, the cavity 125 deforms the particular region 113 of the surface 115 above the plane of the other regions of the surface 115. When used with a mobile phone device, the cavity 125 preferably has a diameter of 2-10 mm. When used with this or other applications, however, the cavity 125 may have any suitable dimension.

2. The Displacement Device

The displacement device 130 of the preferred embodiment functions to influence the volume of the fluid 120 to expand the cavity 125 from the retracted volume setting to the extended volume setting and, ultimately, deforming a particular region 113 of the surface 115. The displacement device 130 preferably modifies the volume of the fluid 120 by (1) modifying the volume of the existing fluid in the cavity 125, or (2) adding and removing fluid to and from the cavity 125. The displacement device 130 may, however, influence the volume of the fluid 120 by any suitable device or method. Modifying the volume of the existing fluid in the cavity 125 most likely has an advantage of lesser complexity, while adding and removing fluid to and from the cavity 125 most likely has an advantage of maintaining the deformation of the surface 115 without the need for additional energy (if valves or other lockable mechanisms are used). When used with a mobile phone device, the displacement device 130 preferably increases the volume of the fluid 120 within the cavity 125 by approximately 0.003-0.1 ml. When used with this or other applications, however, the volume of the fluid may be increased (or possibly decreased) by any suitable amount.

Figure 5A:
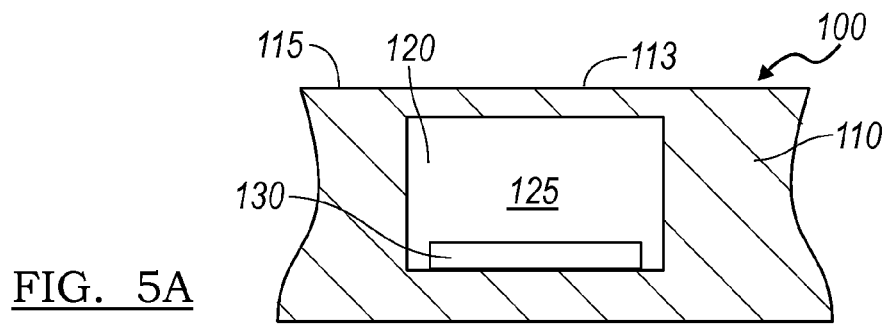
FIGS. 5a and 5b are cross-sectional views of the sheet, the cavity, the sensor, and a displacement device that modifies the existing fluid in the cavity, with the cavity in a retracted volume setting and an expanded volume setting, respectively.
Figure 5B:
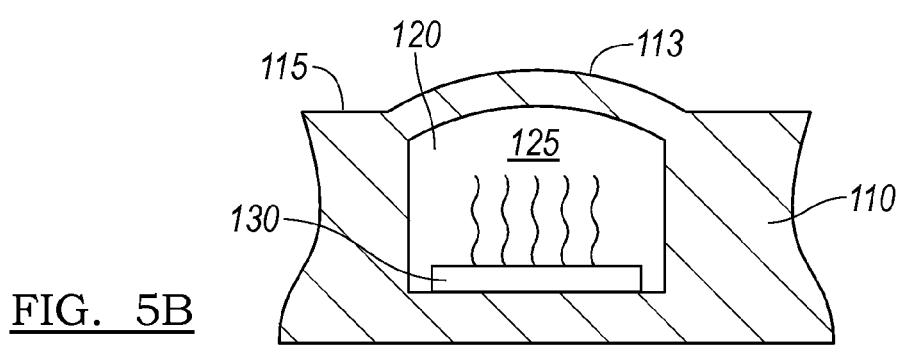

Modifying the existing fluid in the cavity 125 may be accomplished in several ways. In a first example, as shown in FIGS. 5a and 5b, the fluid may be an expandable fluid and the displacement device 130 may include a heating element that heats the expandable fluid, thereby expanding the volume of the existing fluid in the cavity 125 (according to the ideal gas law, PV=nRT). The heating element, which may be located within, adjacent the cavity 125, or any other location suitable to providing heat to the fluid, is preferably a resistive heater (made of a material such as TaN or Nichrome). In a second example, the fluid may include an expandable substance, such as plastic expandable microspheres. In a third example, the fluid may include paraffin. While these are three examples, the displacement device 130 can be any other suitable device or method that ultimately expands the cavity 125 from the retracted volume setting to the extended volume setting by modifying the existing fluid in the cavity 125.

Figure 6:
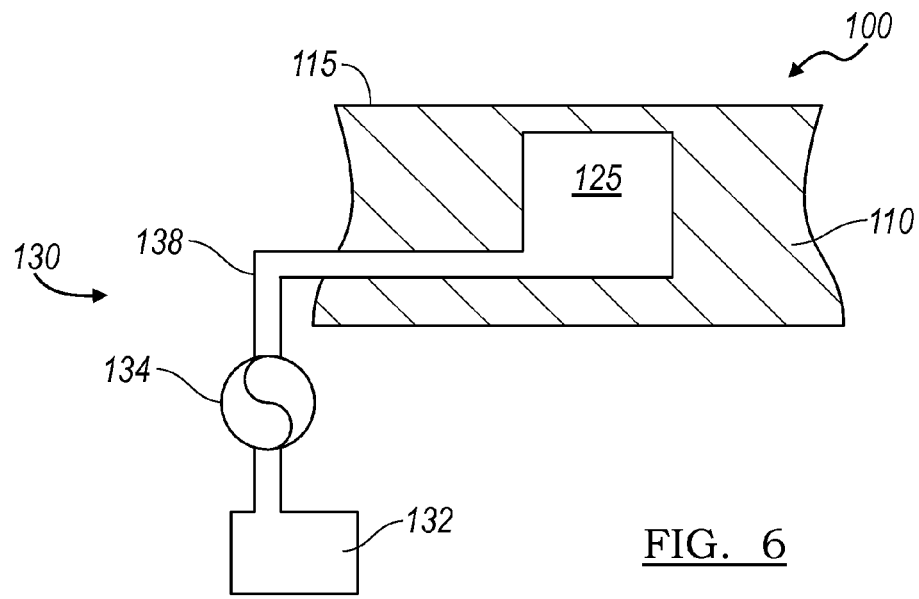
FIG. 6 is a schematic view of the sheet, the cavity, the sensor, and a displacement device of a first example that displaces additional fluid into the cavity.
Figure 7:
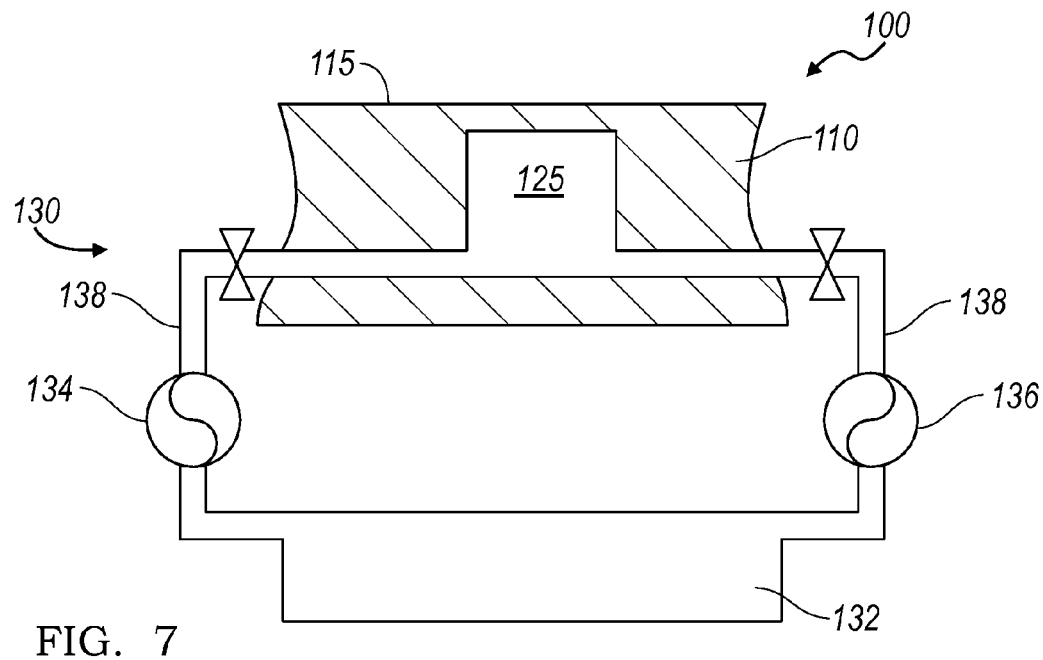
FIG. 7 is a schematic view of the sheet, the cavity, the sensor, and a displacement device of a second example that displaces additional fluid into the cavity.
Figure 8A:
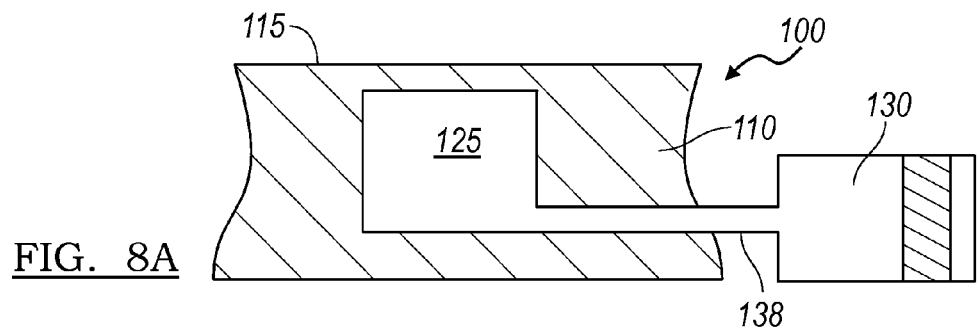
FIGS. 8a and 8b are schematic views of the sheet, the cavity, the sensor, and a displacement device of a third example that displaces additional fluid into and out of the cavity, with the cavity in a retracted volume setting and an expanded volume setting, respectively.
Figure 8B:
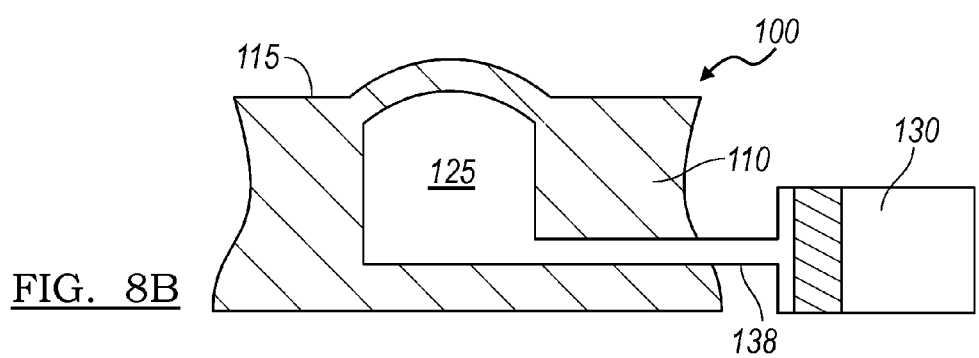

Adding and removing fluid to and from the cavity 125 may also be accomplished in several ways. In a first example, as shown in FIG. 6, the displacement device 130 includes a reservoir 132 to hold additional fluid and a pump 134 to displace fluid from the reservoir 132 to the cavity 125. The reservoir 132 is preferably remote from the cavity 125 (and connected by a channel 138 or other suitable device), but may alternatively be located adjacent the cavity 125 and connected directly to the cavity 125. A portion of the channel 138 is preferably a micro-fluidic channel (having cross-section dimensions in the range of 1 micrometer to 1000 micrometers), but depending on the size and costs constraints of the user interface system 100, the channel 138 may have any suitable dimensions. The pump 134 is preferably a micropump (such as pump #MDP2205 from ThinXXS Microtechnology AG of Zweibrucken, Germany or pump #mp5 from Bartels Mikrotechnik GmbH of Dortmund, Germany), but may be any suitable device to pump fluid from one location to another. The pump 134 is preferably located at a distance from the cavity 125, and is preferably connected to the cavity 125 by a channel 138. To extend the cavity 125 from a retracted volume setting to the extended volume setting, the pump 134 displaces fluid from a reservoir 132, through the channel 138, and into the cavity 125. To retract the cavity 125 from the extended volume setting to the retracted volume setting, the pump 134 preferably "vents" or pumps in a reverse direction from the cavity 125 to the reservoir 132. In a second example, as shown in FIG. 7, the displacement device 130 includes a reservoir 132 to hold additional fluid, a first pump 134 to displace fluid from the reservoir 132 to the cavity 125, a second pump 136 to displace fluid from the cavity 125 to the reservoir 132, a first valve located between the first pump 134 and the cavity 125, and a second valve located between the cavity 125 and the second pump 136. To extend the cavity 125 from the retracted volume setting to the extended volume setting, the first valve is opened, the second valve is closed, and the first pump 134 displaces fluid from the reservoir 132, through the channel 138, and into the cavity 125. To retract the cavity 125 from the extended position to the retracted position, the first valve is closed, the second valve is opened, and the second pump 136 displaces fluid from the cavity 125, through the channel 138, and into the reservoir 132. In other respects, the second example is similar to the first example above. The user interface system 100 may omit the second pump 136 and simply retract the cavity 125 from the extended volume setting to the retracted volume setting by opening the second valve and allowing the cavity 125 to vent or "drain" into the reservoir 132 (potentially assisted by the elasticity of the sheet 110 returning to an un-deformed state). In a third example, as shown in FIGS. 8a and 8b, the displacement device 130 includes an actuator, such as a linear actuator, that displaces fluid into and out of the cavity 125. To extend the cavity 125 from a retracted volume setting to the extended volume setting, as shown in FIG. 8a, the linear actuator displaces fluid through the channel 138 and into the cavity 125. To retract the cavity 125 from the extended volume setting to the retracted volume setting, as shown in FIG. 8b, the linear actuator draws fluid in a reverse direction from the cavity 125 to the reservoir 132. In other respects, the third example is similar to the second example above. While these are three examples, the displacement device 130 can be any other suitable device or method that ultimately expands the cavity 125 from the retracted volume setting to the extended volume setting by adding and removing fluid to and from the cavity 125.

Although the cause of the deformation of a particular region 113 of the surface 115 has been described as a modification of the volume of the fluid in the cavity 125, it is possible to describe the cause of the deformation as an increase in the pressure below the surface 115 relative to the pressure above the surface 115. When used with a mobile phone device, an increase of approximately 0.1-10.0 psi between the pressure below the sheet 110 relative to the pressure above the sheet 110, is preferably enough to deform a particular region 113 of the surface 115. When used with this or other applications, however, the modification of the pressure may be increased (or possibly decreased) by any suitable amount.

3. The Deformation of the Surface and the Sensor

The deformation of the particular region 113 functions to provide tactile feedback and tactile guidance on the surface 115 for the user. The deformation of the particular region 113 also preferably functions to inform the user of the type of input the deformation represents. For example, the deformation of the particular region 113 may be of a shape that indicates the type of input that the deformation represents. For example, a circular deformation may indicate to the user that they are to select an area along the circular deformation. Alternatively, the sheet 110 may include tactile instructions, for example, a pattern of beads on the particular region 113 that indicate the type of input the deformation represents, for example, a deformation may have a tactile pattern of beads that indicate an arrow, informing the user that the deformation is for a directional input. The tactile instructions on the particular region 113 may alternatively be any other type of feature that is able to be felt tactilely by the user. The sheet 110 of the user interface 100 may also be coupled to a graphic (e.g, a paper insert, a photo, etc.) to indicate to the user the input that is associated with depressing the deformed particular region 113. When used in conjunction with the display 150, the user is preferably shown at least one image that is an image of a visual guide or an input key that is substantially aligned with the particular region 113. The display 150 may also display at least two images, with at least one image substantially aligned with the particular region 113 and functioning to visually differentiate the particular region 113 from the rest of the surface 115 and indicating a visual guide or an input key that the deformed particular region 113 represents. From the user's perspective, the device is asking for a user input through the display 150 and the user interface system no is providing tactile guidance and tactile feedback when the user indicates the desired input. The two images may alternatively include a first image and a second image. The first image is displayed and substantially aligned with the particular region 113 and then the second image is displayed and substantially aligned with the particular region 113 when the first image is removed. However, any other arrangement of the user interface system 100 suitable to interfacing with the user may be used.

Figures 9, 10, 12:
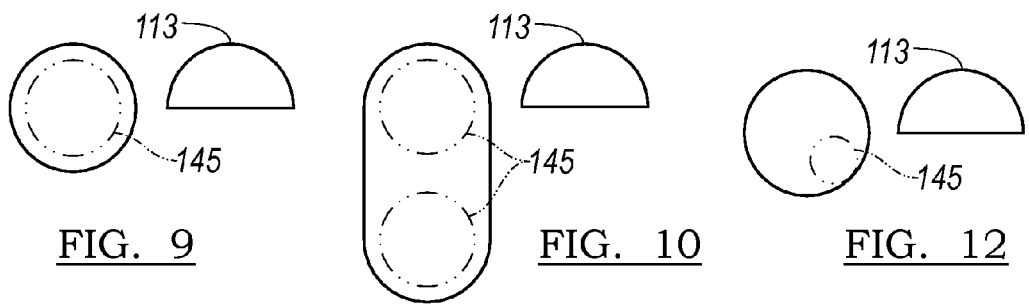
FIGS. 9, 10, 11, and 12 are top and side views of a button deformation, a slider deformation, a slider ring deformation, a guide deformation, and a pointing stick deformation, respectively.
Figure 11:
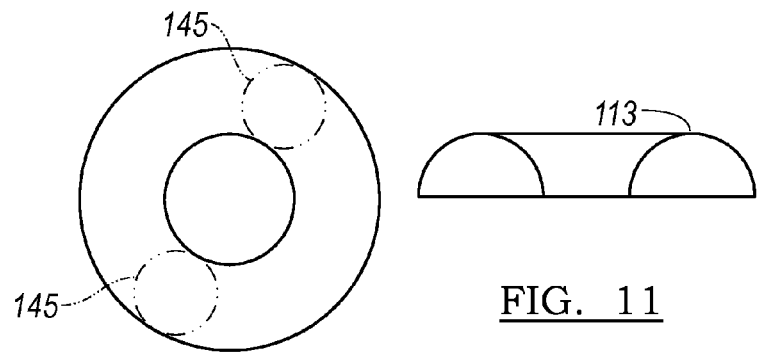

The deformation preferably acts as (1) a button that, when pressed by the user, signals an input to the sensor 140 (2) a slider that may be pressed at multiple points along the deformation by the user and that signals the location of multiple inputs on the sensor 140, and/or (3) a pointing stick that signals the location of multiple inputs on sensor 140. The deformation may, however, act as any other suitable device or method that signals a user input to the sensor 140. The button, as shown in FIG. 9, preferably has a dome-like shape, but may alternatively have a cylindrical-like shape (with a flat top surface), a pyramid-like shape, a cube-like shape (with a flat top), or any other suitable button shape. The sensor 140 preferably recognizes any user touch 145 into the button as a user input. The slider, as shown in FIGS. 10 and 11, preferably has a ridge like shape (shown in FIG. 10), but may alternatively have a ring like shape (shown in FIG. 11), a plus-like shape, or any other suitable slider shape. The sensor 140 preferably recognizes user touches 145 at different locations into the slider and distinguishes these user touches as different user inputs. As an example, the slider with the ring like shape may act like the "click wheel" of the Apple iPod (second generation). The pointing stick, like the button, preferably has a dome-like shape, as shown in FIG. 12, but may alternatively have a cylindrical-like shape (with a flat top surface), a pyramid-like shape, a cube-like shape (with a flat top), or any other suitable button shape. The sensor 140 preferably recognizes user touches 145 at different locations along the pointing stick and distinguishes these user touches as different user inputs. A depression from the force applied by the user on a portion of the pointing stick is meant to signal a user input in the location of the depression relative to the geometry of the pointing stick. For example, in the variation wherein the pointing stick is a dome-like shape, a depression by the user in the upper right quadrant will be interpreted differently than a depression by the user in the lower right quadrant. Additionally, the user may depress the pointing stick in a sweeping motion, for example, a "sweep" from the upper right quadrant to the lower right quadrant. This may be interpreted as a moving input, similar to that seen in the "click wheel" of the Apple iPod (second generation). In another example, the point stick may act like the pointing stick trademarked by IBM as the TRACKPOINT and by Synaptics as the TOUCHSTYK (which are both informally known as the "nipple").

Figure 13:
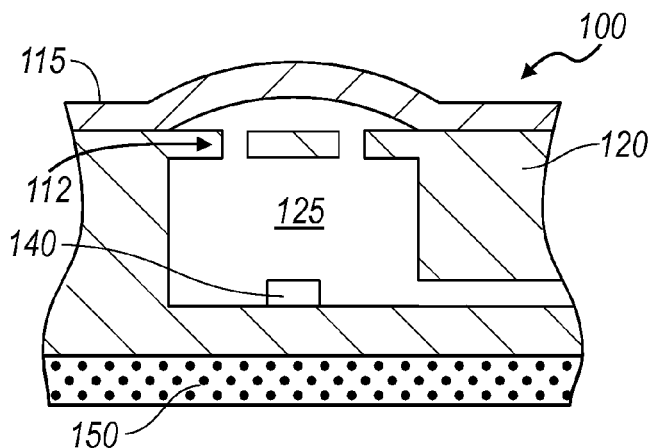
FIG. 13 is a cross-sectional view of a variation of the preferred embodiments with a support structure and a sensor that detects user touch through the support structure.

The sensor 140 may be located within the cavity 125 and/or adjacent to the cavity 125, but may alternatively be located in any other suitable location. In a variation of the sheet no and the cavity 125 that includes a support element 112 underneath the surface 115 for the particular region 113 as shown in FIG. 13, a sensor 140 preferably functions to sense a user input through the support element 112 from any location. The sensor 140 preferably detects the presence of a user touch, an inward depression of the expanded particular region 113, and/or any other suitable user input. The sensor may 140 may also function to detect the direction of the user input, the location of the user input, the rate at which the user is inwardly deforming the expanded particular region 113, the level to which the user is inwardly deforming the expanded particular region 113, the type of user input (for example, input by finger or by stylus), and/or any other suitable characteristic of the user input.

Figure 14A:
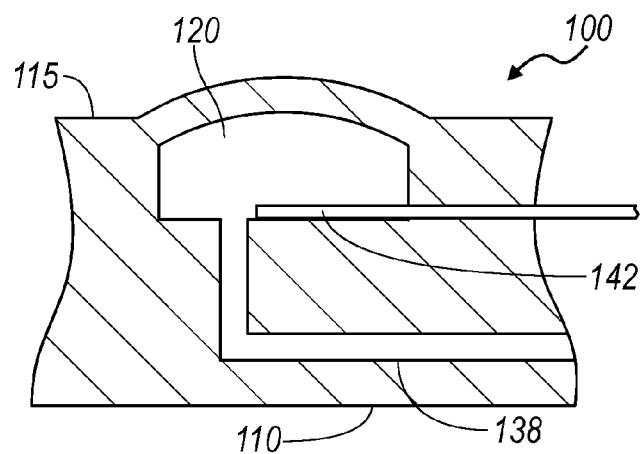
FIGS. 14a, 14b, 14c, and 14d are schematic views of a first, second, third, and fourth example of a first variation of the sensor as a capacitive sensor, respectively.

The sensor 140 is preferably a capacitive sensor that includes at least two conductors that detects a fluctuation in an electric field created by the at least two conductors of the capacitive sensor. The fluctuation may be caused by a user touch, user input through a stylus or any other suitable input assist element, the deformation of the particular region 113, change in fluid position/volume, or any other event that may cause a fluctuation in the electric field that may result in a change in the measured capacitance. The capacitive sensor and is preferably one of several variations. In a first variation, the capacitive sensor includes a first conductor 142 and a second conductor that is a virtual conductor. For example, the virtual conductor may be the virtual ground (such as the shielding ground or the case ground) of the device that the user interface system 100 is appended to, a screen ground for the display 150, or, if the device is a cellular phone, the RF/Signal ground of the device. Fluctuations in the electric field generated between the first conductor 142 and the virtual ground may be used to detect the presence of touch or an input. As shown in FIG. 14, the capacitive sensor is adapted to sense height changes of the fluid 120 within the cavity 125 and/or the presence of a finger on the deformed particular region 113. As shown in FIG. 14a, the first conductor 142 is preferably placed in a location within or adjacent the cavity wherein the inward deformation of the particular region 113 will change the height of the fluid 120 relative to the first conductor 142, thereby influencing the measured capacitance of the capacitive sensor. The first conductor 142 is preferably located on the bottom side of the cavity opposite of the surface 115, allowing the capacitive sensor to sense height changes of the fluid as the particular region 113 is inwardly deformed, but may alternatively be located at the side of the cavity adjacent to the surface 115. When placed adjacent to the surface 115, the first conductor 142 preferably deforms with the particular surface 113 as the user applies force to allow a change in the height of fluid 120 to be sensed. The first conductor 142 may alternatively be placed in any suitable location to allow changes in the height of fluid 120 due to inward deformation of the particular surface 113 to be sensed. The first conductor 142 is preferably made of copper, micro or nanowire, or a transparent conductor such as sputtered indium tin oxide (ITO), but may alternatively be of any type of conductive material wherein the measured capacitance of the conductor is sensitive to height changes of the fluid 120. The capacitive sensor may also function to detect a capacitance change relative to the surface 115 due to the presence of the finger of the user.

Figure 14B:
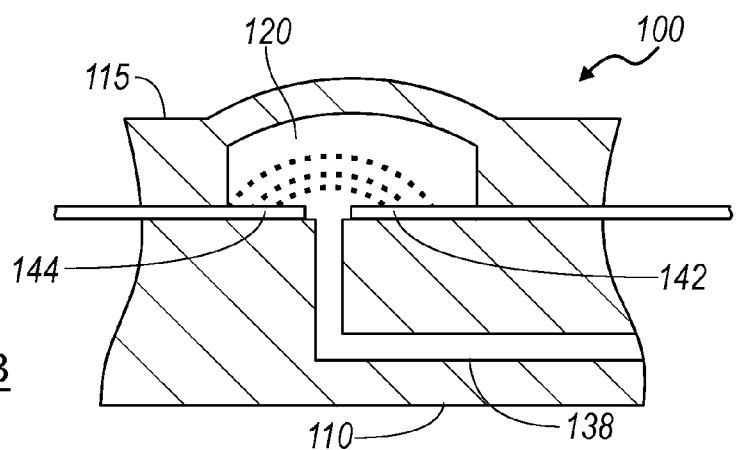

As shown in FIG. 14b, capacitive sensor of the first variation may include a first conductor 142 and a second conductor 144 that is placed within the cavity 125. The second conductor 144 may be used measure the change in capacitance in between the first conductor 142 and the second conductor 144 as the user inwardly deforms the particular region 113. For example, as the user inwardly deforms the particular region 113, the amount of fluid 120 and/or the height of the fluid 120 in between the first conductor 142 and the second conductor 144 may change, causing a change in measured capacitance in between the first conductor 142 and the second conductor 144. The gradient of height difference in between the first conductor 142 and the second conductor 144 may also yield a measurable change in the capacitance in between the first conductor 142 and the second conductor 144. For example, the capacitance reading between the first conductor 142 and the second conductor 144 when the user inwardly deforms the particular region 113 closer to the first conductor 142 may be different from the capacitance reading between the first conductor 142 and the second conductor 144 when the user inwardly deforms the particular region 113 closer to the second conductor 144. This difference may facilitate determining the location of the user input relative to the geometry of the particular region 113. Alternatively, the second conductor 144 may be used to measure height changes of the fluid 120 in the region above the second conductor 144 to work in tandem with the first conductor 142 to provide a more local capacitive measurement of height changes within the cavity 125. Measuring local capacitive changes within the cavity 125 also allows a relative height difference in the fluid 120 to be measured. For example, as the user inwardly deforms the particular region 113, the height of the fluid 120 over the first conductor 142 may be different from the height of the fluid over the second conductor 144, resulting in a difference in the measured capacitance value of the first conductor 142 and the measured capacitance value of the second conductor 144 relative to the surface 115. The capacitance between the first conductor 142 and a first portion of the second conductor 144 may also be compared to the capacitance between the first conductor 142 and a second portion of the second conductor 144 to determine the relative difference in the height of the fluid 120. The relative difference in capacitive values between the two conductors 142 and 144 may facilitate the determination of the location of the user input relative to the geometry of the particular region 113. The first and second portions of the second conductor 144 may be continuous sections along the second conductor 144, but may alternatively be separated by a third portion of a different material from the first and second portions or a break in the second conductor 144. The second conductor 144 may include the first portion and also include a third conductor 146 that contains the second portion. However, any other suitable arrangement and method to determine the occurrence and/or location of a user input through the conductors may be used. The second conductor 144 is preferably identical to the first conductor 142 in material and manufacturing, but may alternatively be made of any material or method suitable to providing a capacitive relationship with the first conductor 142.

Figure 14C:
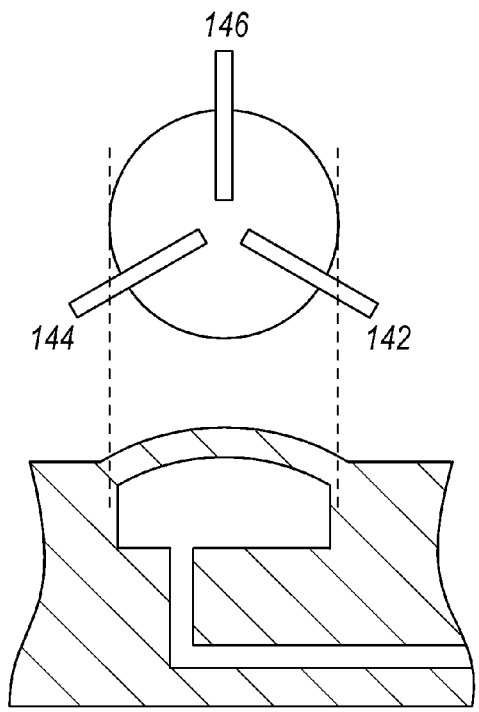
Figure 14D:
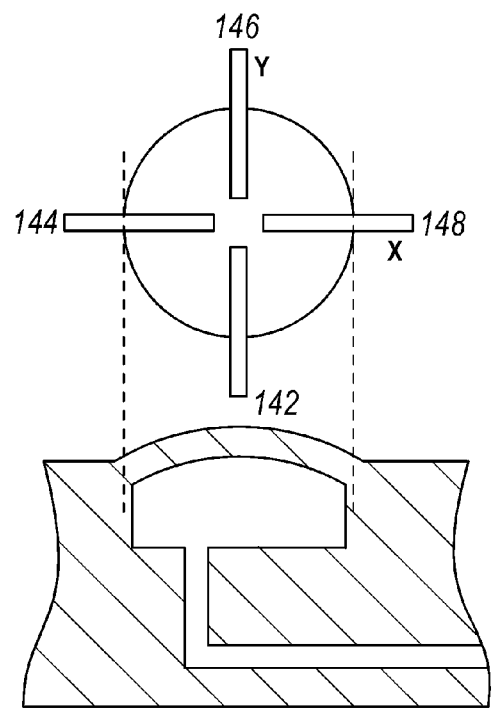
Figure 15A:
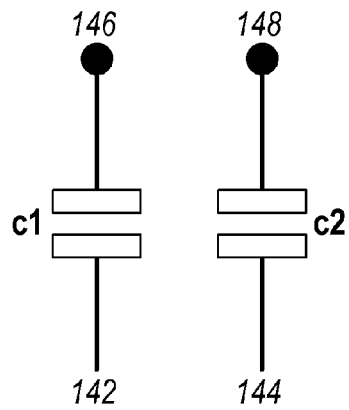
FIGS. 15a and 15b are schematic representations of a first and second method of measuring capacitance of a first variation of the sensor as a capacitive sensor, respectively.
Figure 15B:
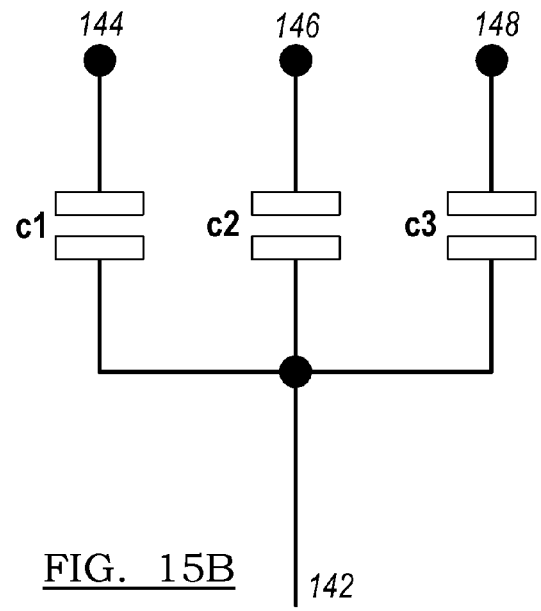

As shown in FIG. 14c and FIG. 14d, the capacitive sensor of the first variation may also include a third conductor 146 and/or a fourth conductor 148. The addition of a third and/or fourth conductor 146 and 148 allows for more accurate determination of the location of user input relative to the geometry of the particular region 113. For example, in the case of four conductors, as shown in FIG. 14d, the particular region 113 may be divided into a four quadrant coordinate system through an X and Y axis with the origin substantially in the center of the particular region 113. In this example, the location of the user input relative to the geometry of the particular region 113 may be measured in a variety of methods. In a first method, as shown in FIG. 15a, the capacitance and/or the relative capacitance between the first conductor 142 and the third conductor 146 may be measured to determine the location of the user input along the X-axis and the capacitance and/or the relative capacitance between the second conductor 144 and the fourth conductor 148 may be measured to determine the location of the user input along the Y-axis. The measured location along the X-axis and the measured location along the Y-axis are then used to determine the location of the user input within the four quadrant coordinate system. In a second method, as shown in FIG. 15b, three capacitance and/or relative capacitance values are measured: between the first conductor 142 and the second conductor 144, between the first conductor 142 and the third conductor 146, and between the first conductor 142 and the fourth conductor 148. The three capacitance values are then preferably used to determine the location of the user input within a four quadrant coordinate system (which can be superimposed over the "tridrant" coordinate system). Similarly, the same methods and/or relationships may be applied to the case of three conductors or any other suitable number of conductors. However, any suitable number of conductors and any other method or relationship between the conductors suitable to determine the location of the user input relative to the geometry of the particular region 113 may be used. The third conductor 146, fourth conductor 148, and/or any other suitable number of conductors are preferably identical to the first conductor 142 in material and manufacturing, but may alternatively made of any material or method suitable to providing a capacitive relationship with the first conductor 142 and/or other conductors.

Figure 16A:
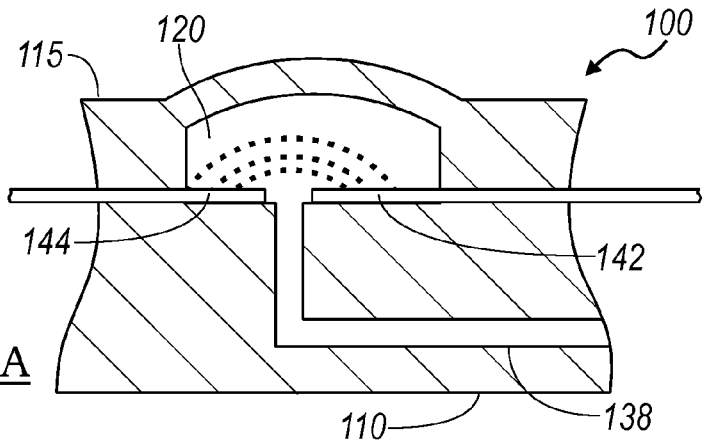
FIGS. 16a, 16b, and 16c are schematic views of a first, second, and third example of the placement of the conductors of the sensor as a capacitive sensor, respectively.
Figure 16B:
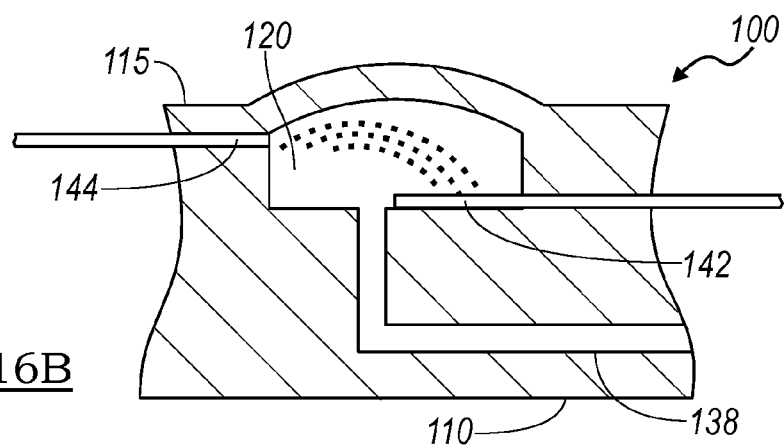
Figure 16C:
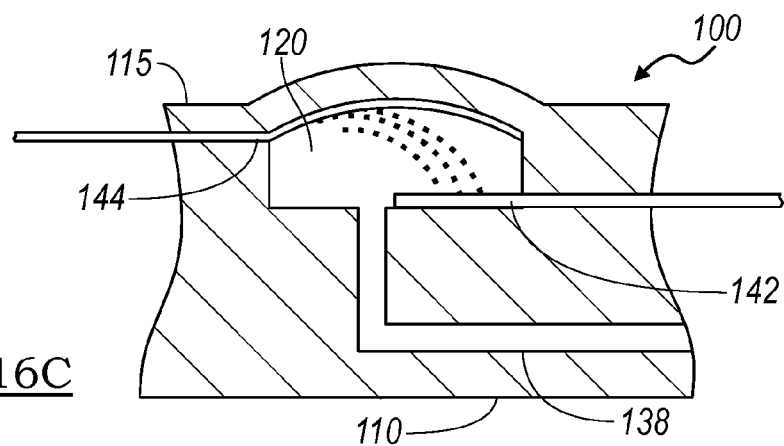

As shown in FIG. 16a, the first conductor 142 is preferably placed at a first level relative to the cavity and the second, third, fourth conductors 144, 146, 148, and/or any other suitable number of conductors are placed at the same level relative to the cavity. Alternatively, as shown in FIG. 16b, the first conductor 142 may be placed at a first level relative to the cavity and the second conductor 144 may be placed at a second level relative to the cavity. In this variation, the second level is preferably higher than the first level, but may alternatively be lower than the first level. The third, fourth conductors 146, 148 and/or any other suitable number of conductors may also be placed at the second level, but may alternatively be located at a third and/or fourth level relative to the cavity. The difference in location placement relative to the height level within the cavity may facilitate accurate measurement of the location of user input relative to the geometry of the particular region 113. Additionally, in the variation of the sheet 115 wherein the sheet 115 includes a layer portion 116 and a substrate portion 118, the first conductor 142 may be coupled to the substrate portion 118 and the second conductor 144 may be coupled to the layer portion 116, as shown in FIG. 16c. However, any other combination of placement of the conductors of the capacitive sensor suitable to determining the location of the user input relative to the geometry of the particular region 113 may be used.

Figure 17A:
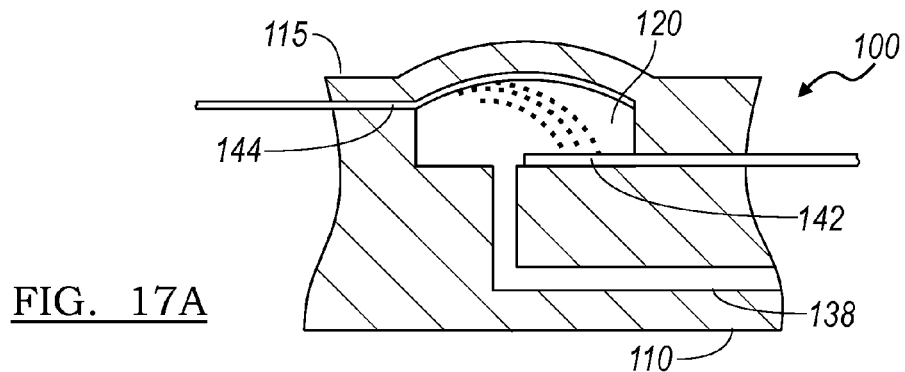
FIGS. 17a and 17b are schematic views of a first and second example of a second variation of the sensor as a capacitive sensor, respectively.
Figure 17B:
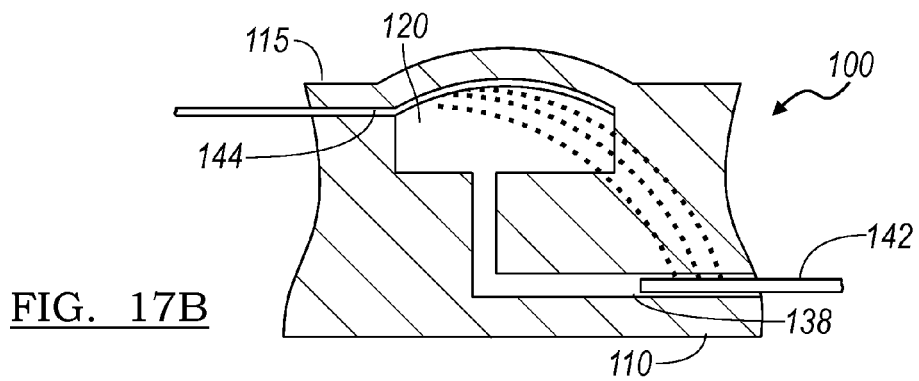

As shown in FIGS. 17a and 17b, the capacitive sensor of the second variation preferably senses the change in height in between a first conductor 142 and a second conductor 144. In this variation, the first conductor 142 is preferably placed in a location that moves when the user inwardly deforms the particular region 113 and the second conductor 144 is preferably placed in a location that remains relatively stationary when the user inwardly deforms the particular region 113. The second conductor 144 may be placed within the cavity 125, as shown in FIG. 17a, but may alternatively be placed in any relatively stationary location within the user interface system 100, as shown in FIG. 17b. In this arrangement, a change in the distance between the first and second conductors 142 and 144 will cause the measured capacitance in between the first and second conductors 142 and 144 to change, indicating a user input. The first conductor 142 may also be a flexible conductor such that the inward deformation of the particular region 113 may cause the first conductor 142 to similarly deform. This may allow the location of the user input relative to the geometry of the particular region 113 to be determined. For example, the capacitive sensor may also include a third conductor 146 and/or any suitable number of conductors that may facilitate accurately determining the location of the user input relative to the geometry of the particular region 113. The movement of the first conductor 142 may be detected by measuring the capacitive value between the first conductor 142 and the second conductor 144 and the capacitive value between the first conductor 142 and the third conductor 146. The difference between the two capacitive values may better indicate the location of the user input relative to the geometry of the particular region 113. Alternatively, the capacitance between the first conductor 142 and a first portion of the second conductor 144 may also be compared to the capacitance between the first conductor 142 and a second portion of the second conductor 144 to determine the relative difference in the height of the fluid 120. The relative difference in capacitive values between the two conductors 142 and 144 may facilitate the determination of the location of the user input relative to the geometry of the particular region 113. However, any other suitable arrangement and location of the conductors of the capacitive sensor of the second variation of the sensor 140 suitable to measuring distance differences between conductors due to inward deformation of the particular region 113 by the user may be used. The conductors of the second variation are preferably identical to the first conductor 142 in the first variation in material and manufacturing, but may alternatively made of any material or method suitable to providing a capacitive relationship indicating the distance between conductors.

Figures 18A, 18B, 18C:
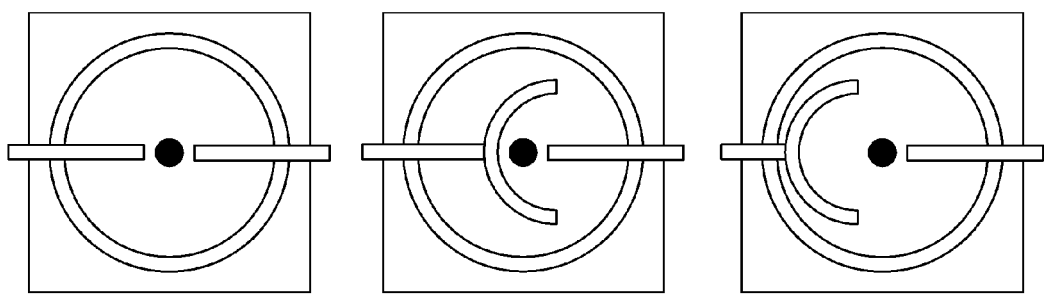
FIGS. 18a-18e are schematic representations of a variety of geometries for the sensor as a capacitive sensor.
Figure 18D:
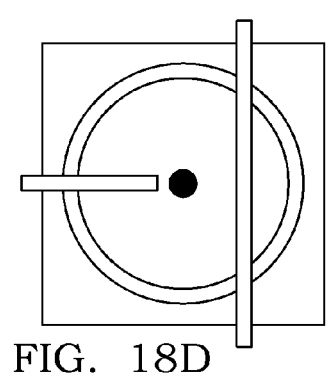
Figure 18E:
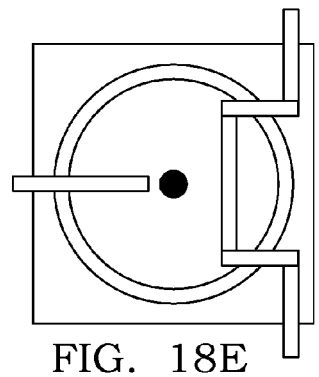

As shown in FIG. 18, the conductors of the capacitive sensor variation of the sensor 140 may be any one of a variety of arrangements and geometries. As mentioned above, both the first and second variations of the capacitive sensor may include at least two conductors (a first conductor and a second conductor). As shown in FIG. 18a, the first and second conductors are preferably of the same shape within the cavity 125. Alternatively, as shown in FIGS. 18b-18e, the first conductor may be of a first geometry and the second conductor may be of a second geometry to increase accuracy in measuring changes in capacitance due to inward deformation of the particular region 113 by the user. For example, the second geometry may follow the geometry of the particular region 113 to facilitate the detection of deformations of the particular region 113, as shown in FIGS. 18b and 18c. The second conductor may be placed substantially close to the perimeter of the particular region 113, but may alternatively be placed substantially close to the center of the particular region 113. However, the second conductor may be placed in any location suitable to detecting the desired user inputs. Alternatively, as shown in FIGS. 18d and 18e, the second conductor may be placed perpendicular to the first conductor to allow deformations to be detected both along the axis of the first conductor and along the axis of the second conductor, expanding the region of sensitivity. Additionally, the second conductor may contain more than one portion wherein the capacitance between the first conductor and a first portion of the second conductor is compared to the capacitance between the first conductor and a second portion of the second conductor. However, any suitable arrangement or geometry of the first and second conductors may be used.

The sensor 140 may alternatively be a resistance sensor. Similar to the capacitive sensor, the resistance sensor preferably has at least two conductors and functions to measure the resistance in between the two conductors. In an example, the two conductors may be placed in two different locations within the cavity 125. The resistance between the two conductors may be of a first value in the retracted state and the resistance between the two conductors may be of a second value in the expanded state. When a user provides a force to inwardly deform the deformed particular region 113, the resistance between the two conductors may be of a third value that may be in between the first and the second value. This reading may be used to determine the occurrence of inward deformation of the expanded particular region 113, but may also be used to determine the degree of inward deformation of the expanded particular region 113 caused by the user.

The sensor 140 may alternatively be a pressure sensor. In this variation of the sensor 140, the fluid 120 is preferably of a volume that substantially fills the cavity 125 and is also preferably of a substantially incompressible fluid (e.g. water, oil), but may be of any other volume or fluid type wherein inward deformation of the particular region 113 will cause a measurable change in the volume of fluid 120 within the cavity 125. The pressure sensor preferably measures an increase in the pressure within cavity 125 when there is an inward deformation of the particular region 113. The pressure sensor is preferably an absolute pressure sensor, but may also be a differential pressure sensor or any other suitable type of pressure sensor. The pressure sensor may alternatively be a strain gauge mounted within and partially defining the cavity, which deforms when there is an inward deformation of the particular region 113. The pressure sensor of the sensor 140 may, however, be of any suitable type to measure pressure change within the cavity 125 due to inward deformation of the particular region 113.

As shown in FIG. 19b, the sensor 140 may alternatively be a flow sensor. The flow sensor preferably measures backflow of the fluid 120. In this variation, the cavity 125 is preferably coupled to a channel 138. When there is inward deformation of the particular region 113, the overall volume of the cavity 125 will decrease, forcing a volume of the fluid 120 to backflow through the channel 138. The flow sensor preferably detects and/or measures the backflow of the fluid 120 through the channel 138 to determine the occurrence of a deformation of the particular region 113 and/or the magnitude of deformation of the particular region 113. To measure the backflow, the flow sensor is preferably placed in a location in the channel 138 wherein fluid flow is only seen when there is backflow due to the inward deformation of the particular region 113. In one example, the channel 138 may also include a valve 122 that is normally closed to maintain a constant volume of fluid 120 within the cavity. When there is inward deformation of the particular region 113, the valve 122 is opened, allowing backflow to the rest of the channel 138. The flow sensor may be a flow rate sensor that measures the flow rate of the fluid. The volume of fluid 120 that flows through the channel 138 may be calculated from the known cross sectional area of the channel 138 and the flow rate. For demonstration and conciseness, the valve 122 and/or sensor 140 are shown to be located in relatively close proximity to the cavity 125 in FIG. 19b. However, the valve 122 and/or sensor 140 may be placed in any other suitable location relative to the cavity 125 (for example, in a region not pictured in FIG. 19b), that enables contact with fluid flowing through the channel 138. The pressure sensor may alternatively be a Hall effect sensor or any other type of sensor that senses the opening of the valve 122 due to the backflow of the fluid 120. However, the flow sensor may be any other type of fluid sensor that is able to detect and/or measure backflow of the fluid 120.

The sensor 140 may alternatively be a strain sensor. The strain gage sensor preferably measures the strain of the particular region 113 of the surface 115. By knowing the nominal strain of the particular region 113 of the surface 115 in the retracted volume setting and in the extended volume setting, the strain sensor identify when the particular region of the surface has been depressed in the extended volume setting. A plurality of strain sensors may facilitate determining the location of the user input relative to the particular region 113. Multiple strain gauges may be coupled either on, under, or within the surface, and the difference in deformation of one portion of the surface relative to another may help indicate the location of the user input relative to the particular region 113.

Because the capacitive, the resistance, the pressure, the flow, and the strain sensor variations of the sensor 140 may allow the location of a user input or a shift in the location of user input along the deformation of the particular region 113 (e.g., as the user "sweeps" from one location to another) to be detected, the sensor 140 of these variation may be applied to the slide and the pointing stick variations of the deformation of the particular region 113 described above.

The sensor 140 is preferably one of the variations described above, but may be any other sensor suitable to sensing the inward deformation of the particular region 113. The sensor 140 may also be of any suitable combination of the variations described above.

4. The Processor

The user interface system 100 of the preferred embodiment may also include a processor, which is coupled to the displacement device 130 and to the sensor 140. As shown in FIG. 20, the processor 160 functions to operate the user interface system 100 in an Extended Cavity Mode and a Retracted Cavity Mode. In the Extended Cavity Mode when the particular region 113 of the surface is outwardly deformed, then a force of a first degree or magnitude applied by the user onto the deformed particular region of the surface 113 is preferably recognized as a user input of a first type. A force of a second degree or magnitude applied by the user onto the deformed particular region 113 of the surface, wherein the second degree is less than the first degree, is preferably recognized as a user input of a second type. In an example, if the force of the second degree is the result of the user resting his or her finger on the particular region 113, then the processor 160 preferably ignores the user input of the second type. In this manner, the deformation of the particular region 113 additionally functions to distance the user touch from the sensor 140 and to allow the user to rest their fingers on the deformation (the location of an input) without actuating the input. Alternatively, if the force of the second degree is the result of the user lightly applying force to the particular region 113, then the processor 160 may interpret the user input of the second type as an input of a lower magnitude than the user input of the first type. However, any other suitable relationship between the user input of the first type and the second type may be applied. The determination of whether the force applied by the user on the particular region 113 is of the first degree or the second degree may be set or modified by the manufacturer, the processor, and/or the user. In the Retracted Cavity Mode when the particular region 113 of the surface is not outwardly deformed, then a user touch at the particular region in the surface 115 is preferably not recognized as a user input of the first type or the second type, but rather as a user input of a third type that is distinguishable from a user input of the first type and the second type. The user input of the third type may also be ignored. Additionally, in the Extended Cavity Mode, a force applied by the user of a third degree, wherein the third degree is lower than the first degree but higher than the second degree, may be interpreted as a user input of a fourth type. However, any additional degrees of force applied by the user on the particular region 113 may be detected and interpreted as any suitable type of user input.

The processor 160 may also function to detect the rate at which the user applies a force to the particular region 160. In the Extended Cavity Mode when the particular region 113 of the surface is outwardly deformed, then a force applied at a first rate of change onto the deformed particular region of the surface 113 is preferably recognized as a user input of a first type. An applied force of a second rate of change onto the deformed particular region 113 of the surface, wherein the second rate is higher than the first rate, is preferably recognized as a user input of a second type. For example, the inward deformation of the particular region 113 may be interpreted by the processor 160 as an indication of the user to scroll through a webpage. When the user applies a force at the first rate, the processor will scroll through the webpage at a first speed. When the user applies a force at the second rate, then the processor will scroll through the website at a second speed, wherein the second speed is faster than the first speed. In this manner, the sensor 140 and the processor 160 are able to determine a larger range of user inputs from the inward deformation of the particular region 113. However, any other suitable relationship between the user input of the first type and the second type may be applied. The question of whether the force applied by the user on the particular region 113 is of the first rate or the second rate may be set or modified by the manufacturer, by the processor, or by the user. In the Retracted Cavity Mode when the particular region 113 of the surface is not outwardly deformed, then a user touch at the particular region in the surface 115 is preferably not recognized as a user input of the first type or the second type, but rather is recognized as a user input of a third type that is distinguishable from a user input of the first type and the second type. The user input of the third type may also be ignored. Additionally, in the Extended Cavity mode, a force applied by the user of a third rate of change, wherein the third rate is higher than the first rate but lower than the second rate, may be interpreted as a user input of a fourth type. However, any additional rate of change of force applied by the user on the particular region 113 may be detected and interpreted as any suitable type of user input.

The processor 160 may also function to automatically alter the settings of the user interface system 100. In a first example, in extremely low temperatures, it may be impossible for the displacement device 130 to modify the volume of the fluid to expand the cavity 125 and deform the particular region 113. The processor 160 may be coupled to a temperature sensor and may disable the displacement device 130 under such conditions. In a second example, in high altitude conditions (or in an airplane with reduced air pressure), it may be impossible for the displacement device 130 to modify the volume of the fluid to retract the cavity 125. The processor 160 may be coupled to a pressure sensor and may either disable the displacement device 130, or may simply adjust the volume of the fluid that is modified under such conditions.

Figure 21:
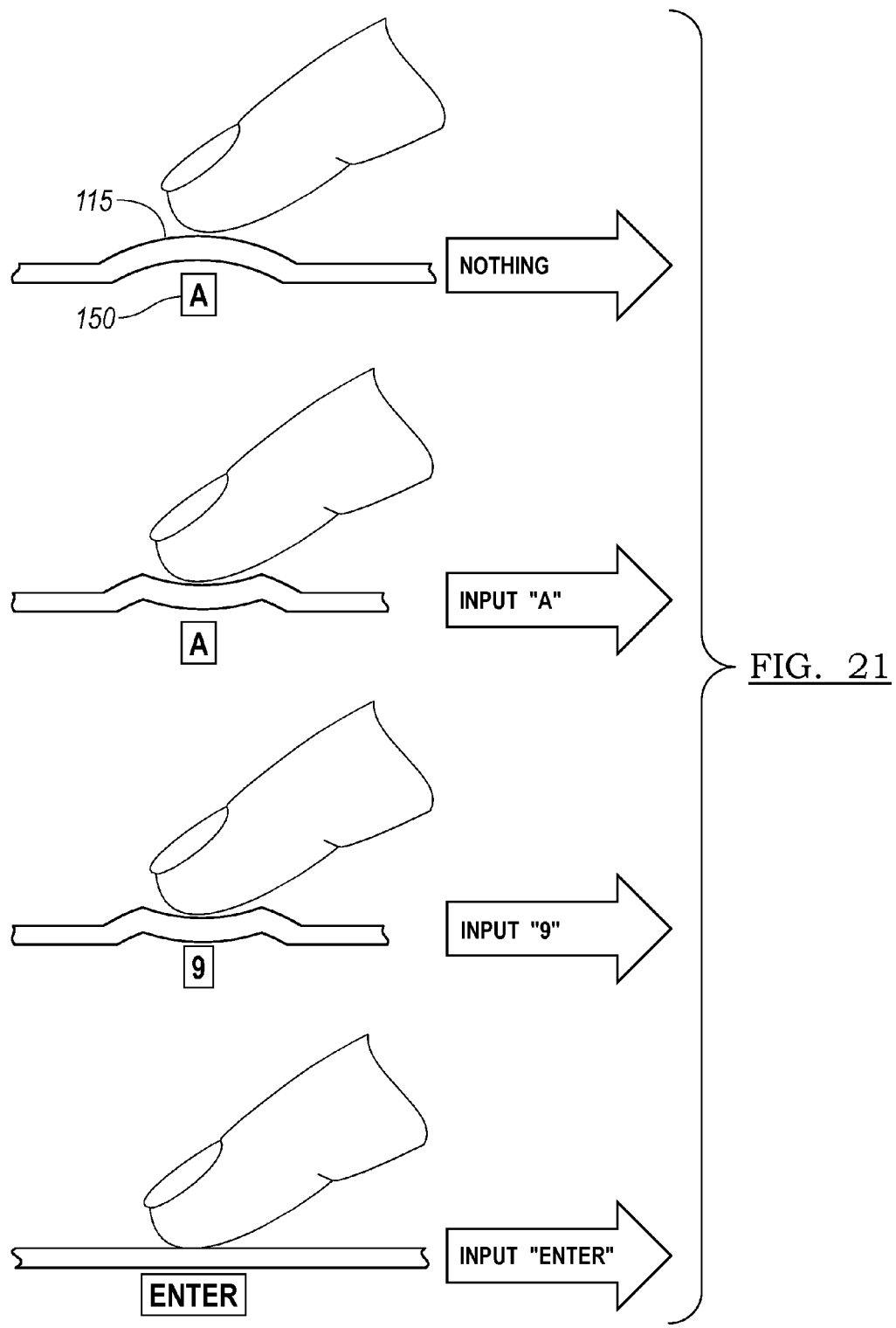
FIG. 21 is a schematic of the different input graphics, different cavity settings, and different user touches of the preferred embodiments.

As shown in FIG. 21, the processor 160 may also be coupled to the display 150 such that different input graphics may be displayed under the particular region 113, and different inputs may be recognized. As an example, when the cavity 125 is in the Extended Cavity Mode, the display 150 may include an input graphic of a first type (such as a letter) and the user input on the deformation would be of a first type (such as a letter), and the display 150 may include an input graphic of a second type (such as a number) and the user input on the deformation would be of a second type (such as a number). When the cavity 125 is in the Retracted Cavity Mode, the display 150 may further include an input graphic of a third type (such as an "enter" or "accept" input), and the user input on the sensor 140 would be of a third type (such as an "enter" or "accept" input). The processor 160 may also be coupled to the device upon which the display 150 and the user interface system 100 are used and may function to control processes carried out by the device.

The processor 160 may also function to alter the output of the display 150 to correct or adjust for any optical distortion caused by the deformation of the particular region 113. It is envisioned that, in certain applications, the size of the deformation may cause a "fish eye" effect when viewing the display 150. The processor, preferably through empirical data, may adjust the output to help correct for this distortion.

The processor 160 preferably includes a separate and remote controller for the displacement device 130, a separate and remote controller for the sensor 140, and a separate and remote controller for the display 150. The processor 160 may, however, integrally include a controller for one or more of these elements.

The processor 160 preferably performs one of the functions described above, but may also perform any combination of the functions described above or any other suitable function.

5. Second Cavity

As shown in FIG. 1, the user interface system 100 of the preferred embodiment also includes a second cavity 125. The additional cavities may be substantially identical to the cavity 125, but may also be different in construction, geometry, size, and/or any other suitable feature. Each of the plurality of cavities 125 are preferably able to outwardly deform independently from each other, allowing the user interface system 100 to be adapted to a variety of user input scenarios. Alternatively, the plurality of cavities 125 may be grouped into a plurality of portions, wherein the cavities 125 within one group will outwardly deform together. This may be applied to scenarios wherein a group of cavities 125 are assigned to a particular user input scenario, for example, as a dial pad on a mobile phone or as a QWERTY keyboard. The processor 160 preferably selectively controls the outward deformation of the particular region 113 of each cavity 125. However, any other suitable method of controlling the cavities 125 may be used.

Figure 22:
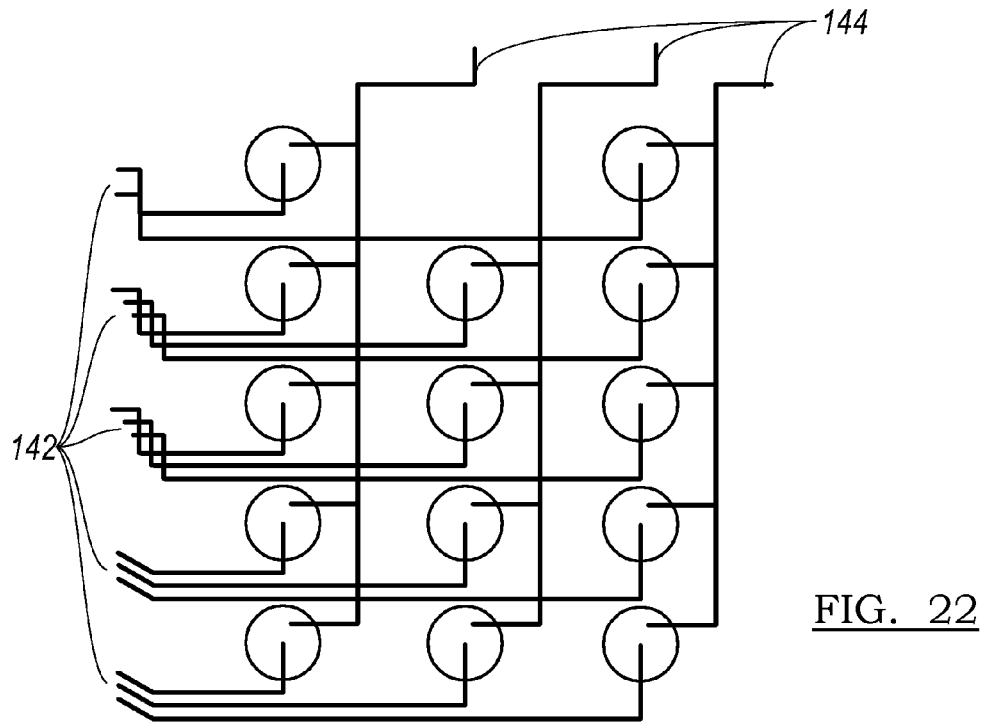
FIG. 22 is a top view of the sensor that is a capacitive sensor with an X-conductor and a Y-conductor per cavity.
Figure 23:
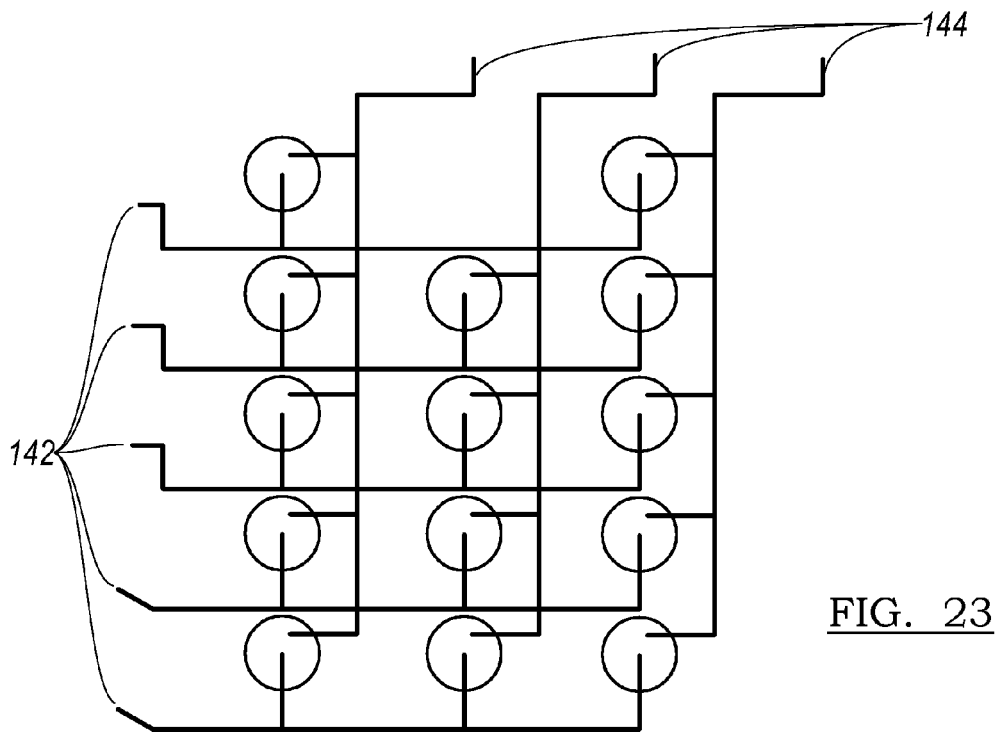
FIG. 23 is a top view of the sensor that is a capacitive sensor with fewer than an X-conductor and a Y-conductor per cavity.

The processor 160 preferably also selectively receives and/or interprets signals representing the presence of a force applied by a user to any cavity 125. The sensor 140 for each cavity 125 is preferably arranged in an array network that preferably communicates the location of each sensor 140 to the processor 160 to allow the processor 160 to selectively receive and/or interpret signals coming from each cavity 125. In the variation of the sensor 140 as a capacitive sensor, as shown in FIGS. 22 and 23, the array includes a first number of X-conductors 142 and a second number of Y-conductors 144. In a first variation, as shown in FIG. 22, the first number of X-conductors 142 is preferably equivalent to the number of cavities 125, wherein each X-first conductor 142 corresponds to one cavity 125, and the second number of Y-conductors 144 is preferably equivalent to the number of columns of cavities 125, wherein each Y-conductor 144 corresponds to all the cavities 125 within one column of cavities 125. In this first variation, the location of a user touch is preferably determined by detecting a change in the measured capacitance value between one X-first conductor 142 and the corresponding Y-conductor 144 for a particular cavity 125. Because each cavity 125 is associated with one X-first conductor 142, the processor 160 is able to detect the location of the cavity 125 over which the user had applied a force. In a second variation, as shown in FIG. 23, the first number of X-conductors 142 is preferably equivalent to the number of rows of cavities 125, wherein each X-first conductor 142 corresponds to all the cavities 125 within one row of cavities 125, and the second number of Y-conductors 144 is preferably equivalent to the number of columns of cavities 113, wherein each Y-conductor 144 corresponds to all the cavities 113 within one column of cavities 144. In this second variation, the location of a user touch is preferably determined by detecting a change in the measured capacitance value between one X-first conductor 142 and one Y-conductor 144. Because each cavity 125 corresponds to a different intersection of the X-conductors 142 and the Y-conductors 144, the processor 160 is able to detect the location of the cavity 125 over which the user had applied force. In a third variation, the first number of X-conductors 142 and the second number of Y-conductors 144 are both preferably equivalent to the number of cavities 125, one X-first conductor 142 and one Y-conductor 144 correspond to one cavity 125. In this third variation, the location of a user touch is preferably determined by detecting a change in the measured capacitance value between one X-first conductor 142 and one Y-conductor 144. Because each cavity 125 corresponds to a different pair of the X-conductors 142 and the Y-conductors 144, the processor 160 is able to detect the location of the cavity 125 over which the user had applied force.

Alternatively, the array network of sensors 140 may include a plurality of sensors 140, each coupled to a cavity 125, that each output a signal specific to the cavity 125. For example, in the capacitive sensor variation of the sensor 140, the sensor 140 for a first cavity 125 may send a signal of 0.5 nF when a user input is detected and a signal of 1 nF when no user input is detected, the sensor 140 for a second cavity 125 may send a signal of 5 nF when a user input is detected and a signal of 10 nF when no user input is detected, the sensor 140 for a third cavity 125 may send a signal of 50 nF when a user input is detected and a signal of 100 nF when no user input is detected, and the sensor 140 for a fourth cavity 125 may send a signal of 500 nF when a user input is detected and a signal of 1000 nF when no user input is detected. Because each cavity 125 sends a different signal, the processor 160 is able to detect the location of the user input based upon the type and/or value of the signal that is received from the sensors 140. The plurality of sensors 140 for the cavities 125 may also be arranged in a parallel relationship (such that the overall capacitive value for a plurality of capacitors in parallel equate to the sum of the individual capacitive values) to facilitate the processor 160 in sensing the location of the user input. For example, using the aforementioned example values for the signals from the sensors 140 of a first, second, third, and fourth cavities 140, the processor 160 may receive a combined signal of 555.5 nF from the sensors 140 when a user input is detected from all of the first, second, third, and fourth cavities 125 and a signal of 1111 nF from the sensors 140 when no user input is detected from any of the first, second, third, and fourth cavities 125. When a user input is detected from the third cavity 125 and not from the first, second, and fourth cavities 125, then the combined signal to the processor 160 may be 1061 nF. Similarly, when a user input is detected from both the second and third cavities 125, then the combined signal to the processor 160 may be 1056 nF. The processor 160 is then able to interpret the locations of the user input directly from the value of the signal that is received from a plurality of sensors 140 of the cavities 125, simplifying electrical routing, mechanical components, and programming in the user interface system 100. The sensors 140 may also be arranged in series or in any other suitable electrical arrangement.

The array arrangements described above also provide the advantage of utilizing multiple sensors 140 to more accurately locate the presence of a user input. User input onto a first expanded particular region 113 may affect the sensor 140 readings for a second expanded particular region 113. By collectively analyzing readings from multiple sensors 140, the particular region 113 upon which the user provides an input may be more accurately determined. For example, in the variation wherein the sensor 140 is a pressure sensor, the pressure sensed by other sensors 140 within the system may be increased when a user provides input at a first particular region 113. By sensing the increase of pressure sensed by sensors 140 adjacent to a particular region 113, the location of the user input may be more accurately determined. Additionally, the array arrangements described above allows for multiple inputs provided at a single time to be detected by the system.

The sensors 140 are preferably located within the cavities 125, but may alternatively be located adjacent to the cavities 125 or both within and adjacent to the cavities 125. By placing sensors 140 both within and adjacent to the cavities 125, user inputs provided to locations other than the particular regions 113 may also be detected, expanding the range of input types and query types for the device. Sensors 140 placed adjacent to the cavities 125 may also be used to more accurately locate the particular region 113 upon which the user provided the input.

The sensor 140, cavity 140, and second cavity 140 may are preferably in arranged in one of the variations described above, but may also be any combination of the variations described above. However, any other suitable arrangement or method of controlling the cavities 125 may be used.

6. Power Source

The user interface system 100 of the preferred embodiments may also include either a power source or a power harnessing device, which both function to power the displacement device 130 (and possibly other elements of the user interface system, such as the sensor 140 and/or the display 150). The power source is preferably a conventional battery, but may be any suitable device or method that provides power to the displacement device 130. The power-harnessing device, which is preferably integrated into the hinge of a flip phone or laptop, functions to harness a portion of the energy involved in the normal use of the electronic device (such as the physical energy provided by the user in the opening of a flip phone or the screen on a laptop). The power-harnessing device may alternatively be integrated in a separate mechanical input device (such as a button on the side of a mobile phone, or a "self-winding" device found in automatic watches) or any other suitable device or method to harness a portion of the energy involved in the normal use of the electronic device.

As a person skilled in the art will recognize from the previous detailed description and from the figures and claims, modifications and changes can be made to the preferred embodiments of the invention without departing from the scope of this invention defined in the following claims.

We claim:

1. A user interface comprising:
   a substrate comprising an attachment face, a cavity adjacent the attachment face, and a fluid channel fluidly coupled to the cavity;
   a tactile layer comprising a tactile surface and a back surface opposite the tactile surface, the back surface coupled to the attachment face at a first region of the tactile layer, the back surface arranged over the cavity and disconnected from the substrate at a deformable region of the tactile layer;
   a displacement device configured to displace fluid through the fluid channel and into the cavity to transition the deformable region from a retracted setting into an expanded setting, the deformable region defining a first tactile formation in the retracted setting, and the deformable region elevated above the first region and defining a second tactile formation tactilely distinguishable from the first formation in the expanded setting;
   a first conductor arranged over the cavity and supported by the deformable region;
   a second conductor supported by the substrate adjacent the cavity and opposite the first conductor, capacitively coupled to the first conductor, offset from the first conductor by a first distance in the retracted setting, and offset from the first conductor by a second distance greater than the first distance in the expanded setting; and a processor detecting an input on the deformable region in response to a change in capacitance between the first conductor and the second conductor.

2. The user interface of claim 1, wherein the substrate defines a support member extending over the cavity adjacent the attachment face and a second fluid channel communicating fluid from the cavity through the support member, wherein the attachment face and the support member define a planar surface, and wherein the support member is disconnected from the deformable region and supports the deformable region against inward deformation into the cavity.

3. The user interface of claim 2, wherein, in the retracted setting, the back surface of the deformable region is in contact with the support member.

4. The user interface of claim 1, wherein the deformable region and the first region are adjacent and of substantially similar thicknesses.

5. The user interface of claim 1, wherein, in the retracted setting, the tactile surface of the deformable region is flush with the tactile surface of the first region and wherein, in the expanded setting, the tactile surface of the deformable region is elevated above a portion of the tactile surface of the first region.

6. The user interface of claim 1, further comprising a display coupled to the substrate and visually outputting an image through the tactile surface.

7. The user interface of claim 6, wherein the display outputs the image of an input key substantially aligned with the deformable region.

8. The user interface of claim 1, wherein the displacement device comprises a displacement pump.

9. The user interface of claim 1, wherein the displacement device displaces fluid out of the cavity to transition the deformable region from the expanded setting into the retracted setting.

10. The user interface of claim 1, wherein the substrate further comprises a second cavity and a second fluid channel fluidly coupled to the cavity, wherein the back surface of the tactile layer is arranged over the second cavity and disconnected from the substrate at a second deformable region of the tactile layer, and wherein the displacement device displaces fluid through the second fluid channel into the second cavity to transition the second deformable region from a retracted setting to an expanded, the second deformable region defining a third tactile formation in the retracted setting, and the deformable region elevated above the first region and defining a fourth tactile formation tactilely distinguishable from the third formation in the expanded setting.

11. The user interface of claim 10, wherein the displacement device selectively transitions the deformable region and the second deformable region between the retracted setting and the expanded setting.

12. The user interface of claim 10, further comprising a third conductor arranged over the second cavity and supported by the second deformable region, the second conductor extending toward the second cavity, capacitively coupled to the third conductor, offset from the third conductor by a third distance for the second deformable region in the retracted setting, and offset from the third conductor by a fourth distance greater than the third distance for the second deformable region in the expanded setting, and the processor detecting an input on the second deformable region in response to a change in capacitance between the third conductor and the second conductor.

13. The user interface of claim 1, wherein the first conductor is coupled to the back surface of the tactile layer at the deformable region and is arranged over the cavity, and wherein the second conductor is coupled to a base of the cavity opposite the tactile layer.

14. The user interface of claim 13, wherein the second conductor extends into the cavity.

15. The user interface of claim 13, wherein the tactile layer supports the first conductor about a perimeter of the cavity.

16. The user interface of claim 1, wherein the first conductor, the second conductor, and the processor comprise a capacitive sensor configured to generate an electromagnetic field across the cavity, to detect a change in the electromagnetic field across the first conductor and the second conductor as a deformation of the deformable region, and to output a signal corresponding to the change in the electromagnetic field.

17. The user interface of claim 16, wherein the processor interprets the change in the electromagnetic field as an input on the tactile surface proximal the deformable region.

18. The user interface of claim 17, wherein the processor detects a magnitude of a force of the input on the tactile surface, compares the magnitude to a threshold magnitude, correlates the input with a first input type if the magnitude is less than the threshold magnitude, and correlates the input with a second input type if the magnitude is greater than the threshold magnitude.

19. The user interface of claim 17, wherein the processor detects a change rate of the force of the input on the tactile surface, compares the change rate of the detected force to a threshold change rate, correlates the input with a first input type if the change rate is less than the threshold change rate, and correlates the input with a second input type if the change rate is greater than the threshold change rate.

20. The user interface of claim 16, wherein the tactile layer defines a set of deformable regions, and wherein the sensor includes an array of first conductors supported by the tactile layer and an array of second conductors supported by the substrate, the processor detecting deformation of each deformable region in the set of the deformable regions due to a touch on the tactile surface based on capacitances between first conductors in the array of first conductors and second conductors in the array of second conductors.

21. The user interface of claim 20, wherein the array of first conductors includes a first number of first conductors equivalent to a number of deformable regions in the tactile layer, wherein the array of second conductors includes a second number of second conductors less than the number of deformable regions, wherein each first conductor corresponds to one deformable region, and wherein each second conductor corresponds to a plurality of deformable regions.

22. The user interface of claim 1 incorporated into an electronic device selected from the group consisting of: an automotive console, a desktop computer, a laptop computer, a tablet computer, a television, a radio, a desk phone, a mobile phone, a PDA, a personal navigation device, a personal media player, a camera, and a watch.

23. The user interface of claim 1, wherein the first conductor is arranged within the tactile layer over the deformable region.

24. A user interface comprising:

a substrate defining an attachment face, a cavity adjacent the attachment face, and a fluid channel fluidly coupled to the cavity;

a tactile layer defining a tactile surface, a first region coupled to the attachment face, and a deformable region arranged over the cavity and disconnected from the substrate;

a displacement device displacing fluid through the fluid channel and into the cavity to transition the deformable region from a retracted setting into an expanded setting, the deformable region substantially flush with the first region in the retracted setting and elevated above the first region in the expanded setting;

a first conductor arranged over the cavity and supported by the deformable region;

a second conductor supported by the substrate adjacent the cavity and opposite the first conductor, capacitively coupled to the first conductor, offset from the first conductor by a first distance in the retracted setting, and offset from the first conductor by a second distance greater than the first distance in the expanded setting; and a processor detecting an input on the deformable region in response to a change in capacitance between the first conductor and the second conductor.

25. The method of claim 24, wherein the first conductor is arranged within the tactile layer at the deformable region, and wherein the second conductor is arranged within the cavity proximal a base of the cavity opposite the tactile layer.

* * * * *